United States Patent
Lorry

(10) Patent No.: US 12,190,546 B2
(45) Date of Patent: Jan. 7, 2025

(54) COLOR MATCHING SYSTEM AND METHODS OF USE

(71) Applicant: Roseane Lorry, Phoenix, AZ (US)

(72) Inventor: Roseane Lorry, Phoenix, AZ (US)

(*) Notice: Subject to any disclaimer, the term of this patent is extended or adjusted under 35 U.S.C. 154(b) by 285 days.

(21) Appl. No.: 17/475,154

(22) Filed: Sep. 14, 2021

(65) Prior Publication Data

US 2022/0092825 A1 Mar. 24, 2022

Related U.S. Application Data

(60) Provisional application No. 63/078,447, filed on Sep. 15, 2020.

(51) Int. Cl.
| | | |
|---|---|---|
| *G06T 7/90* | (2017.01) | |
| *G06F 3/0482* | (2013.01) | |
| *G06F 16/532* | (2019.01) | |
| *G06F 16/583* | (2019.01) | |
| *G06Q 30/0601* | (2023.01) | |

(52) U.S. Cl.
CPC ............. *G06T 7/90* (2017.01); *G06F 3/0482* (2013.01); *G06F 16/532* (2019.01); *G06F 16/5838* (2019.01); *G06Q 30/0641* (2013.01); *G06T 2200/24* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 10,379,721 B1* | 8/2019 | Natesh | G06F 3/0482 |
| 11,055,759 B1* | 7/2021 | Natesh | G06F 16/9535 |
| 2009/0252371 A1* | 10/2009 | Rao | H04N 1/6052 |
| | | | 382/100 |
| 2012/0045121 A1* | 2/2012 | Youngman | G06Q 30/0643 |
| | | | 382/162 |
| 2013/0300761 A1* | 11/2013 | Ahmed | G06Q 30/0643 |
| | | | 345/595 |
| 2015/0186965 A1* | 7/2015 | Paul | G06Q 30/0613 |
| | | | 235/494 |
| 2015/0379006 A1* | 12/2015 | Dorner | G06F 16/5838 |
| | | | 707/772 |

* cited by examiner

*Primary Examiner* — Howard Cortes
(74) *Attorney, Agent, or Firm* — Schmeiser, Olsen & Watts LLP

(57) ABSTRACT

The present invention relates to a system for determining the colors of different objects for comparison. The system may include user computing devices connected to a server storing user data, digital photographs, and texture data. A user computing device operates an app, through which a user may compare the colors of objects in different photos. The server may be programmed to analyze the matching in color between the different objects and return a color matching, expressed as a matching percentage from 0% to 100%, for display on the user computing device. The system may be used to send and receive messages between users and contacts. The system may also be used to visualize objects as they would appear if they were made of a different color or texture. Methods of use are also disclosed.

12 Claims, 27 Drawing Sheets

COLOR MATCHING SYSTEM AND METHODS OF USE

CROSS REFERENCE TO RELATED APPLICATION[S]

This application claims priority to U.S. Provisional Patent Application Ser. No. 63/078,447, filed Sep. 15, 2020, the disclosure of which is hereby incorporated entirely herein by reference.

BACKGROUND OF THE INVENTION

Technical Field

This invention relates generally to a system for determining the colors of different objects for comparison.

State of the Art

Many people have difficulty determining precise colors of objects or distinguishing between colors of different objects that may be similar in color. For example, a person may have a pair of shoes at home, of a particular color. The person may go shopping and desire to purchase an accessory item of the same color as the shoes, but the person is unable to remember the precise color of the shoes. Even if the person carried a digital photo of the shoes, such as on a cell phone, for example, the cell phone display may display the shoes in such a manner that the shoes appear to be a slightly different color on the display than they are in reality.

Accordingly, what is needed is a system for helping people to easily and reliably determine colors of different objects for comparison.

SUMMARY OF THE INVENTION

The present invention relates to a system for determining the colors of different objects for comparison. The system may include user computing devices, and a server, wherein each user computing device is coupled to the computer server. The server may include a memory storing, without limitation, user data, one or more digital photographs, and texture data, stored in digital format.

The user computing device may be coupled to the server, and the server may be programmed to receive a signal that includes first digital photograph data and second digital photograph data, wherein the first digital photograph data includes a first digital photograph and a first pinpoint identifying a particular portion of the first photograph, such an individual pixel of the first photograph corresponding to a color of a first object in the first photograph, and the second digital photograph data includes a second digital photograph and a second pinpoint identifying a particular portion of the second photograph, such an individual pixel of the second photograph corresponding to a color of a second object in the second photograph; automatically store the first and second digital photograph data in a memory of the server; automatically process the first and second digital photograph data received to determine the digital codes of the pixels corresponding to the colors of the first and second objects identified by the first and second pinpoints, respectively; perform a comparison analysis to determine the degree of matching between the two colors, expressed as a matching percentage from 0% to 100%; and send the matching percentage to the user computing device for display on the user computing device.

In operation, a user may be using a user computing device that is operating a color matching app. The app creates a user interface for display and user input on the user computing device. The app further creates a connection between the user computing device and the server.

Using the app, the user may access digital photographs stored on the user computing device and upload one or more digital photographs to the server. Through the app, the user may also access a camera of the user computing device, such as by accessing a native file application for operation of the camera. Through the app, the user may send and receive messages, including photos and/or text, audio, and video, to other users of the system and/or other contacts that are not users of the system.

The system may include third-party websites that are connected to or otherwise interact with the system.

The server may be further programmed to store texture data, including visual representations of various textures of various objects, in digital format. A user may utilize the system to edit photos in order to visualize objects as they would appear if they were of a different texture or color.

Another embodiment includes a system for determining a match of colors of different, the system comprising: a server comprising a memory for storing user data and digital photographs; and a user computing device coupled to the server coupled, wherein the server is programmed to: receive a signal from the user computing device that the user computing device has accessed the system and selected a quick mode operation of the system and send for display on the user computing device an upload picture user interface; receive a first selected image uploaded to the server from the user computing device and automatically generate and send for display a pick color user interface displaying the first selected image with a color selection dropper; receive a first selected color in response to selection of a color in the first selected image by the dropper and confirmation of the color with the user computing device and store the first selected color in the memory of the server and associate it with the first selected image; send for display on the user computing device the upload picture user interface after storing the first selected image and the first selected color; receive a second selected image uploaded to the server from the user computing device and automatically generate and send for display the pick color user interface displaying the second selected image with the color selection dropper; receive a second selected color in response to selection of a color in the second selected image by the dropper and confirmation of the color with the user computing device and store the second selected color in the memory of the server and associate it with the second selected image; perform a comparison analysis to determine the degree of matching between the first and second selected colors, expressed as a matching percentage from 0% to 100% in response to a signal received from the user computing device initiating the comparison of the first and second selected colors; and send the matching percentage to the user computing device for display on the user computing device.

Another embodiment includes a system for determining a match of colors of different, the system comprising: a server comprising a memory for storing user data and digital photographs; and a user computing device coupled to the server coupled, wherein the server is programmed to: receive a signal from the user computing device that the user computing device has accessed the system and selected an advance mode operation of the system and send for display on the user computing device an upload picture user interface; receive a first selected image uploaded to the server from the user computing device and automatically generate and send for display a pick color user interface displaying the first selected image with a color selection dropper; receive a first selected color in response to selection of a color in the first selected image by the dropper and confirmation of the color with the user computing device and store the first selected color in the memory of the server and associate it with the first selected image; send for display on the user computing device the upload picture user interface after storing the first selected image and the first selected color; receive a second selected image uploaded to the server from the user computing device and automatically generate and send for display the pick color user interface displaying the second selected image with the color selection dropper; receive a second selected color in response to selection of a color in the second selected image by the dropper and confirmation of the color with the user computing device and store the second selected color in the memory of the server and associate it with the second selected image; send for display on the user computing device an item type user interface after storing the first selected image and the first selected color, wherein the item type user interface comprises a plurality of selectable elements comprising at least one of fabrics, items, accessories, make-up, home decor or combinations thereof; receive at least one selected element from the plurality of selectable elements; perform a comparison analysis to determine the degree of matching between the first and second selected colors including adjusting the degree of matching by analyzing the at least one selected element, expressed as a matching percentage from 0% to 100% in response to a signal received from the user computing device initiating the comparison of the first and second selected colors; and send the matching percentage to the user computing device for display on the user computing device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to a system for determining the colors of different objects for comparison. The system may include the use of a mobile application operating on a user computing device that may be a mobile computing device, such as a smartphone, a tablet, a wearable, and the like; and/or the system may operate on any type of computing device as a downloadable application or even as a web application. The system may also include the use of programmed instructions operating on a server and communicating with the user computing device in order to provide the functionality of the system.

Figure 1:
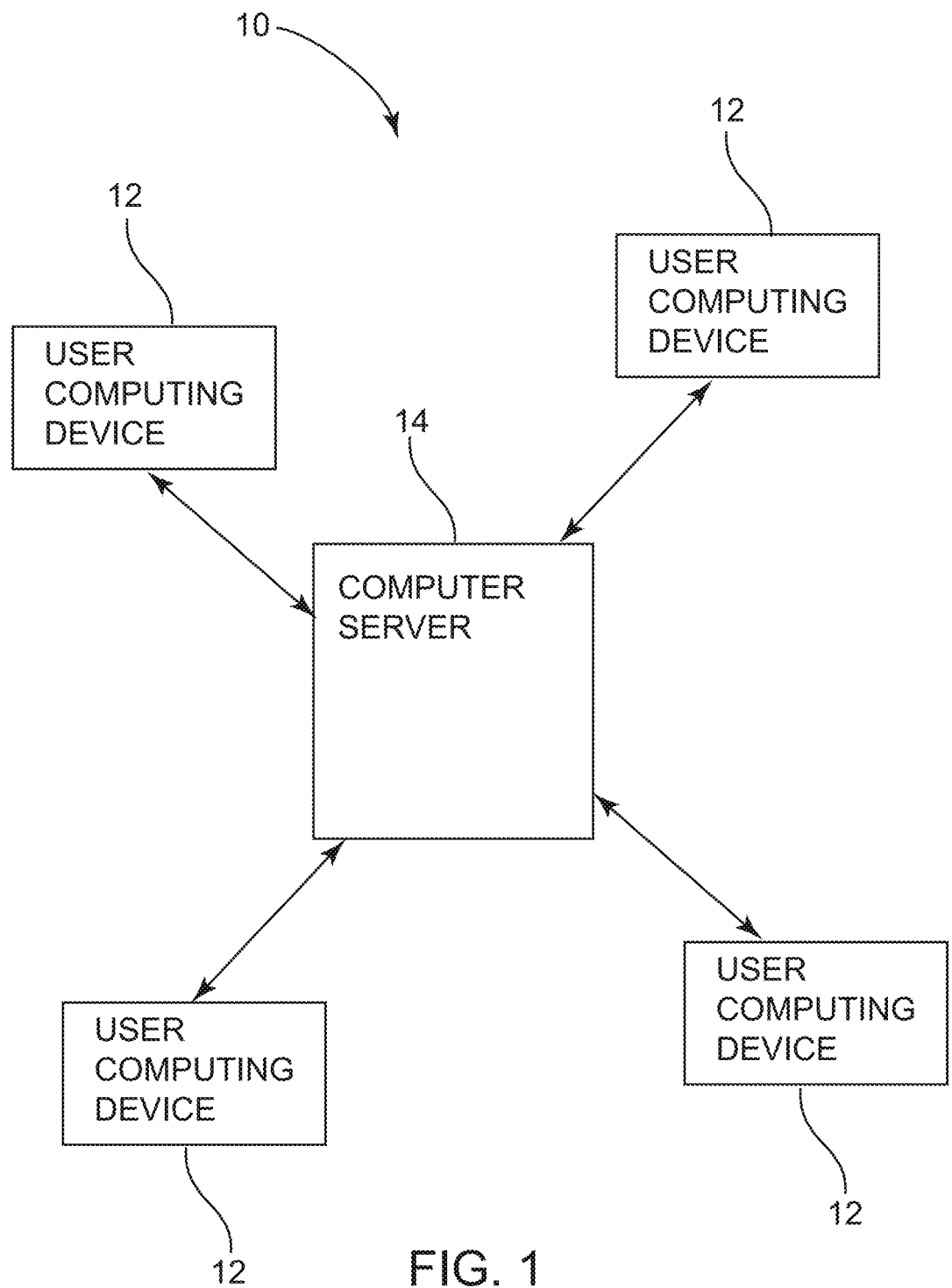
FIG. 1 depicts a diagram of a color matching system, according to an embodiment.

FIG. 1 depicts an embodiment of a system for determining the colors of different objects for comparison 10. The system 10 may include user computing devices 12, and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a wearable device and the like. The server 14, in some embodiments, may be a computer server or a cloud-based infrastructure architecture.

The server 14 may include a memory storing user data, wherein the user data may include, without limitation, user demographic information, a profile picture, and login information, such as a user ID and password; one or more digital photographs, wherein each of the one or more digital photographs is associated with a corresponding user; and texture data, including visual representations of various textures of various objects, stored in digital format.

Figure 2:
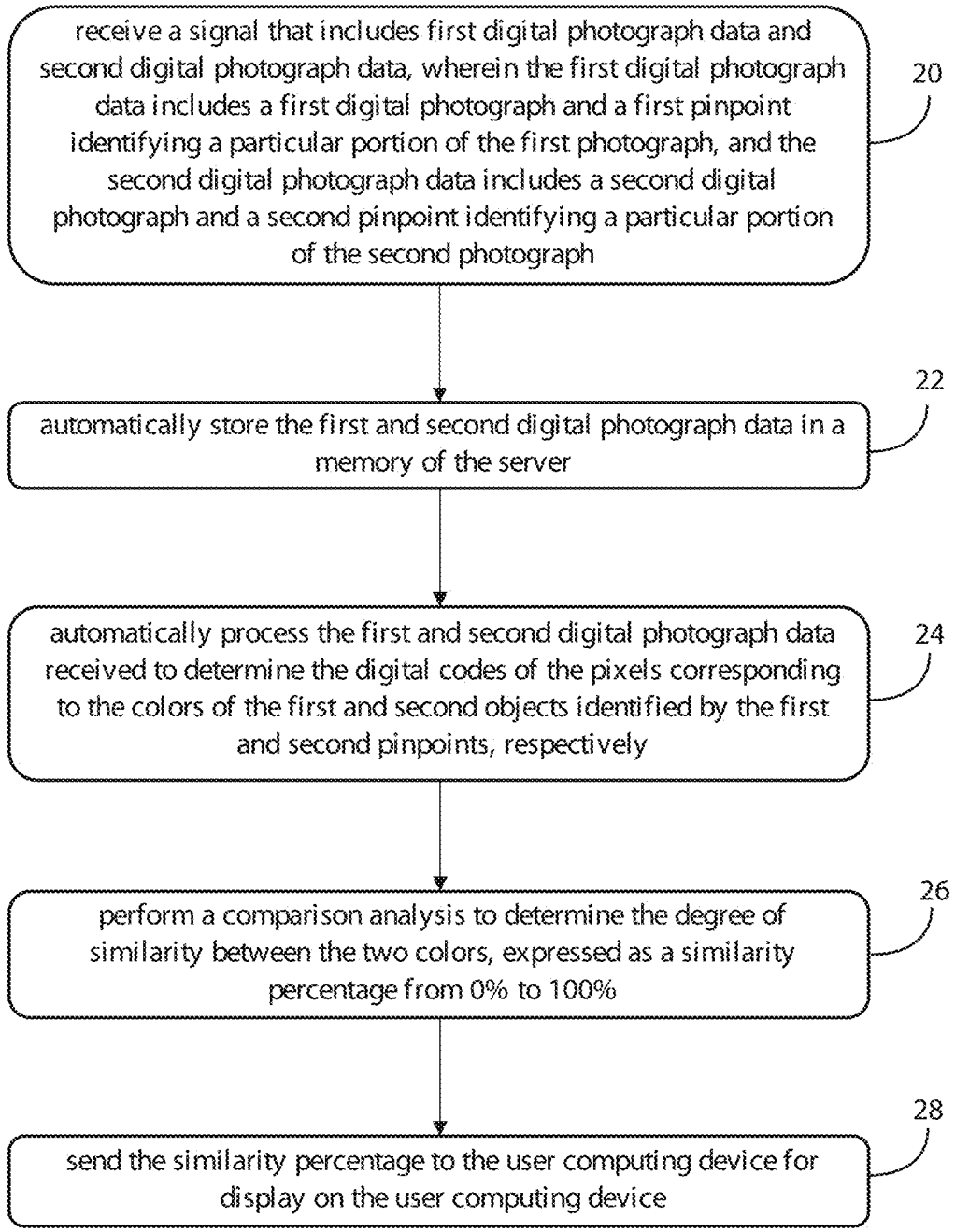
FIG. 2 is a block diagram of programmed steps of a server of a color matching system, according to an embodiment.

FIG. 2 is a block diagram of programmed steps of a server of a color matching system, according to an embodiment. The user computing device 12 may be coupled to the server 14, and, as shown in FIG. 2, the server 14 may be programmed to receive a signal that includes first digital photograph data and second digital photograph data, wherein the first digital photograph data includes a first digital photograph and a first pinpoint identifying a particular portion of the first photograph, such an individual pixel of the first photograph corresponding to a color of a first object in the first photograph, and the second digital photograph data includes a second digital photograph and a second pinpoint identifying a particular portion of the second photograph, such an individual pixel of the second photograph corresponding to a color of a second object in the second photograph [Step 20]; automatically store the first and second digital photograph data in a memory of the server 14 [Step 22]; automatically process the first and second digital photograph data received to determine the digital codes of the pixels corresponding to the colors of the first and second objects identified by the first and second pinpoints, respectively, wherein the digital codes may be in any common digital format for color identification, known now or in the future, such as RGB or CMYK, for example [Step 24]; perform a comparison analysis to determine the degree of matching between the two colors, expressed as a matching percentage from 0% to 100% [Step 26]; and send the matching percentage to the user computing device 12 for display on the user computing device 12 [Step 28].

In operation, a user may be using a user computing device 12 that is operating a color matching app. The app creates a user interface for display and user input on the user computing device 12. The app further creates a connection between the user computing device 12 and the server 14. The server 14 may be programmed to interact with the user on the user computing device 12 to initially create a user account. The user account may include user data including demographic information about the user, a profile picture, and login information, such as a user ID and password, wherein the user data is stored on the server 14. The user may subsequently use the app to login to the user account on the server 14 in order to use the other features of the app on the user computing device 12, as well as aspects of the system 10 processed on the server 14 in response to user input on the user computing device 12 through the app.

Using the app, the user may access digital photographs stored on the user computing device 12 and upload one or more digital photographs to the server 14. Each of the digital photographs stored on the server 14 is associated with a user account of the user on the server 14. Through the app, the user may also access a camera of the user computing device 12, such as by accessing a native file application for operation of the camera. The user may use the camera to take a new digital photograph and then upload the new digital photograph to the server 14 for storage on the server 14.

In some embodiments, the app operating on the user computing device 12 may include, without limitation, a home screen, a profile screen, an inbox screen, a contacts screen, a saved files and photos screen, a match that screen, and a match that plus screen.

Figure 3:
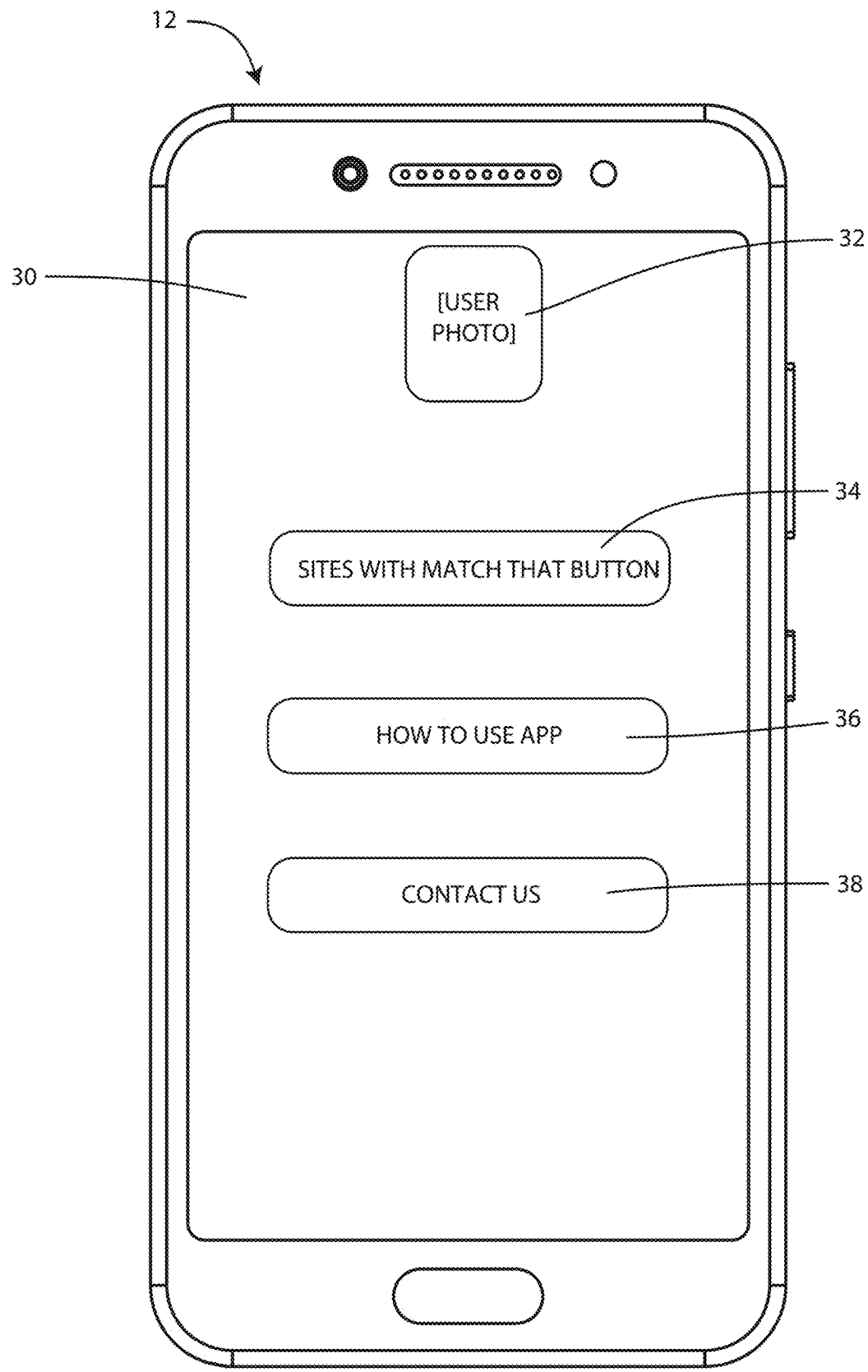
FIG. 3 is a front view of a user computing device operating a color matching app of a color matching system to display a home screen of the app, according to an embodiment.

An example of a home screen 30 is shown in FIG. 3. As shown, the home screen 30 may display the user's name and/or profile picture 32, and a plurality of soft buttons, which may include, without limitation, a "sites with match that" button 34, a "how to use app" button 36, and a "contact us" button 38. Upon selection of the "sites with match that" button 34, a list is displayed containing a list of third-party websites, each of which is connected to or otherwise interacts with the system 10. Such third-party websites may be programmed, for example, to include selectable soft buttons, such as a "match that" button, for example, displayed on the third-party website for selection by the user to interact with the system 10 via the third-party website. Data, including information regarding such third-party websites, which may include, for example, a list of such third-party websites and their corresponding URLs, may be stored on the server 14 for retrieval and display on the user computing device 12. Upon selection of the "how to use app" button 36, a user manual is displayed for the user to access, wherein the user manual includes instructions for operation of the app. Upon selection of the "contact us" button 38, various forms of contact information are displayed for viewing by the user, which the user may use to contact the owners of the system 10.

Figure 4:
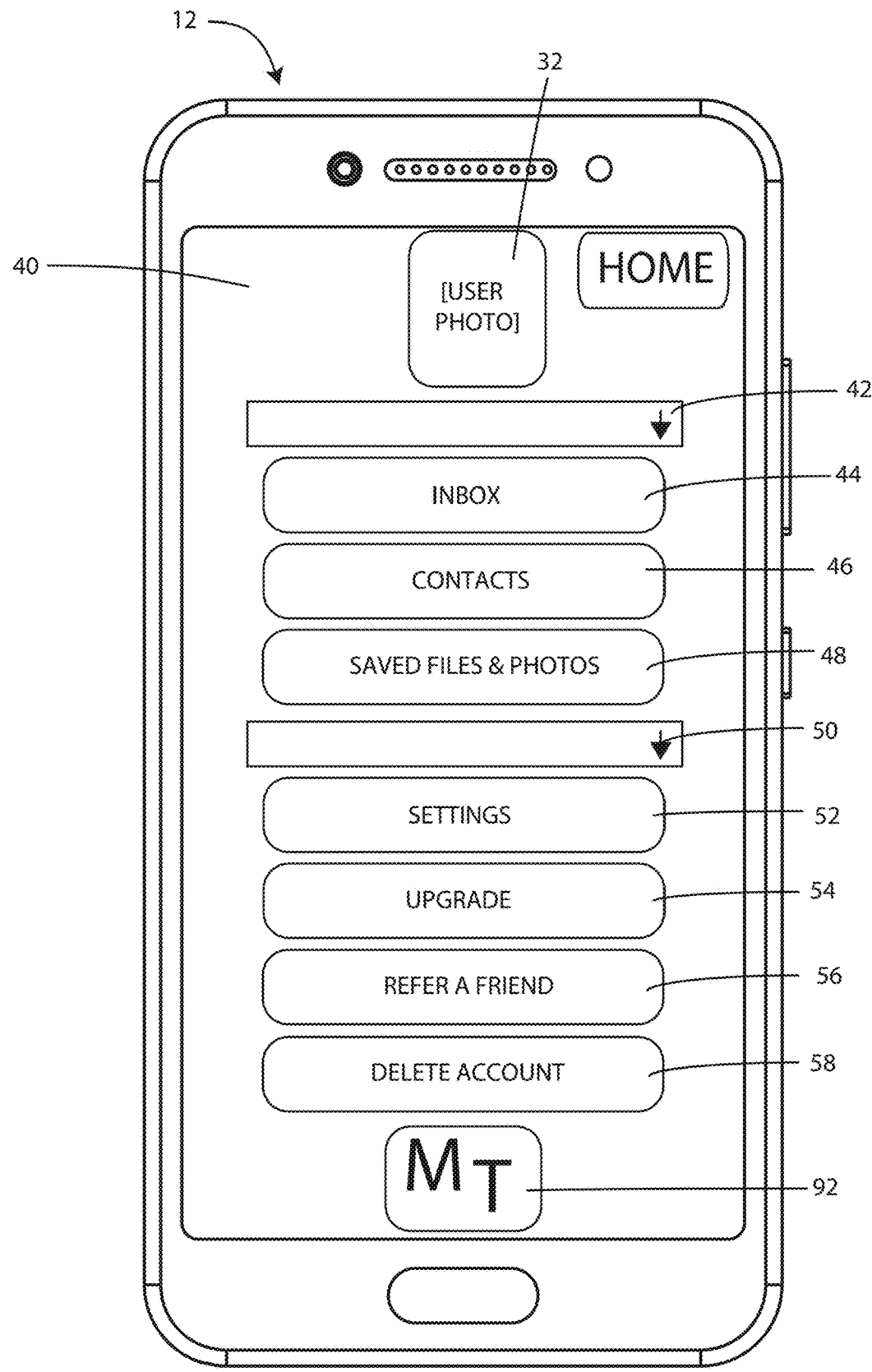
FIG. 4 is a front view of a user computing device operating a color matching app of a color matching system to display a home screen of the app, according to an embodiment.
Figure 5:
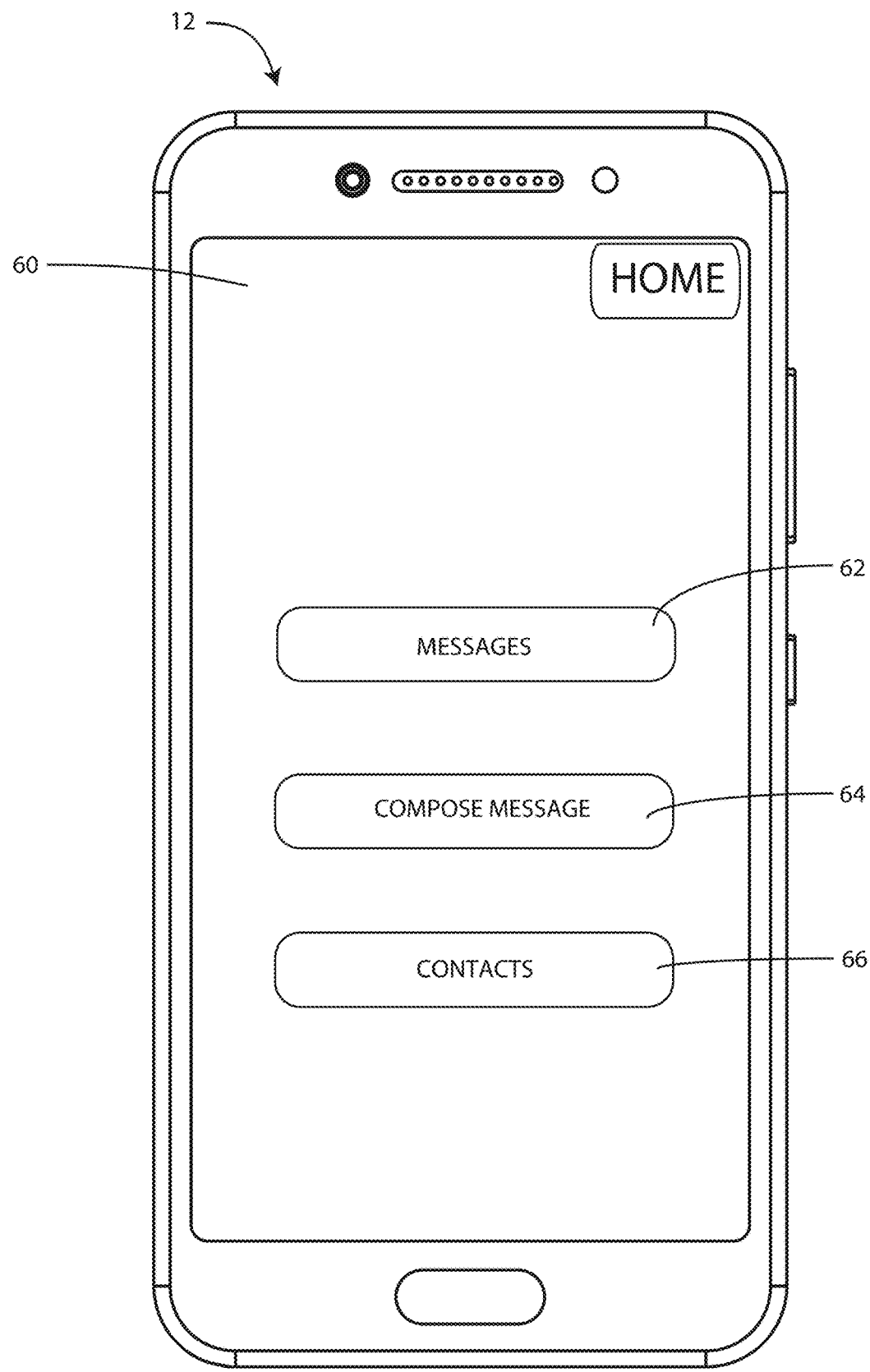
FIG. 5 is a front view of a user computing device operating a color matching app of a color matching system to display an inbox screen of the app, according to an embodiment.
Figure 6:
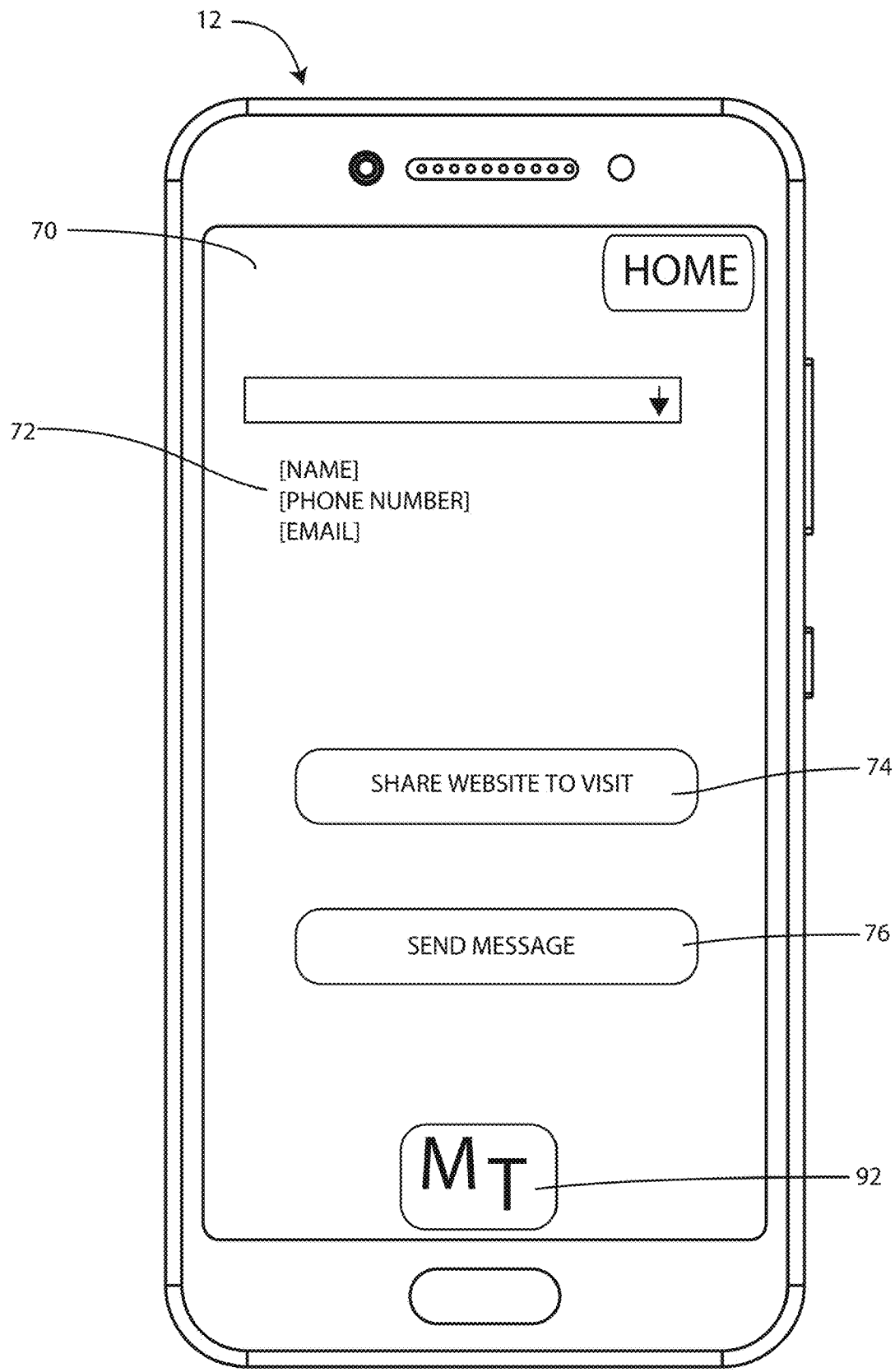
FIG. 6 is a front view of a user computing device operating a color matching app of a color matching system to display a contacts screen of the app, according to an embodiment.
Figure 7:
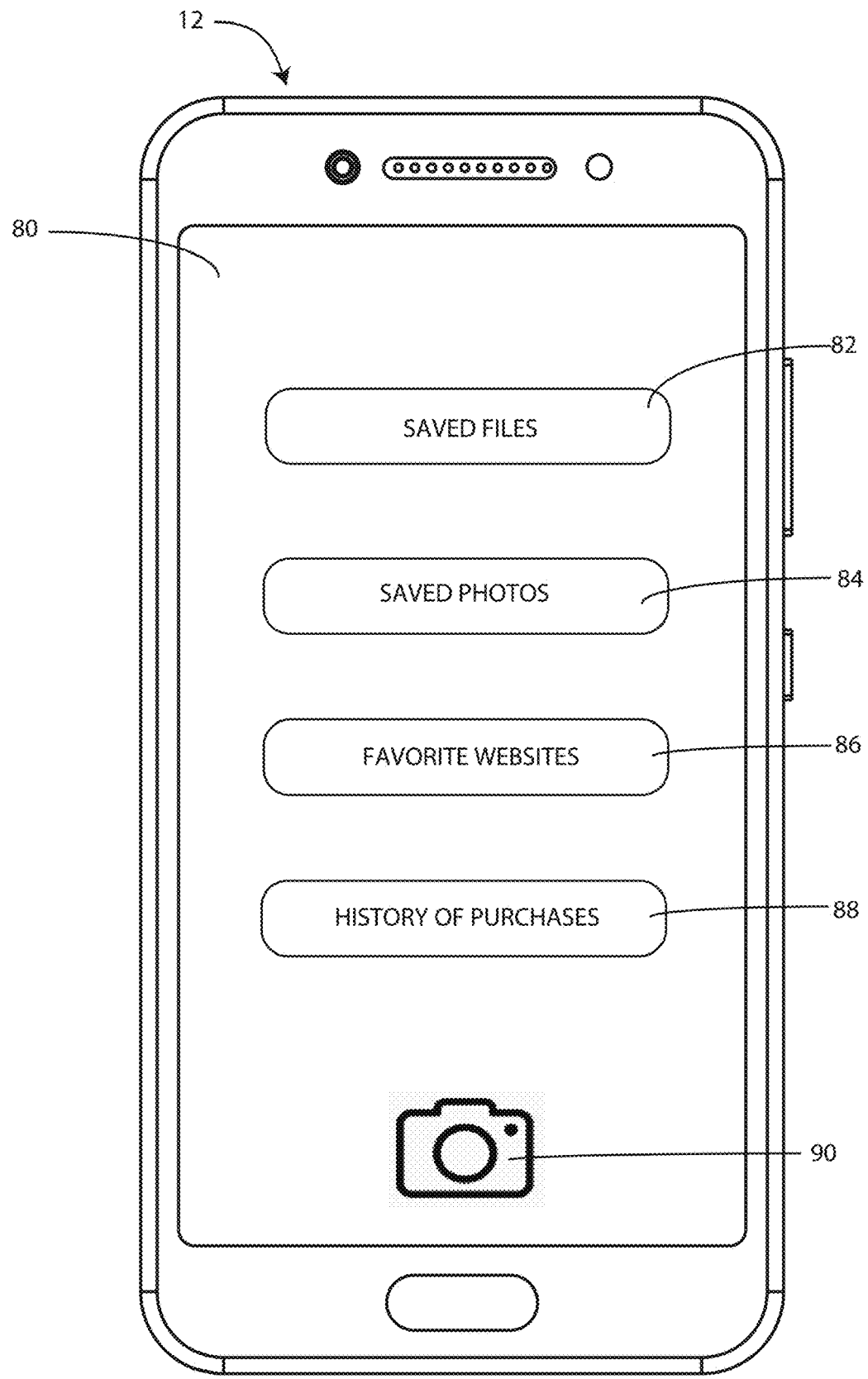
FIG. 7 is a front view of a user computing device operating a color matching app of a color matching system to display a saved files and photos screen of the app, according to an embodiment.

An example of a profile screen 40 is shown in FIG. 4. As shown, the profile screen 40 may display the user's name and/or profile picture 32, and a plurality of soft buttons, which may include, without limitation, a first drop tab 42 and a second drop tab 50. Upon selection of the first drop tab 42, a list of soft buttons is displayed, which may include an "inbox" button 44, a "contacts" button 46, and a "saved files & photos" button 48. Selection of the "inbox" button 44 opens the inbox screen 60, as shown in FIG. 5. Selection of the "contacts" button 46 opens the contacts screen 70, as shown in FIG. 6. Selection of the "saved files & photos" button 48 opens the saved files & photos screen 80, as shown in FIG. 7. Upon selection of the second drop tab 52, a list of soft buttons is displayed, which may include a "settings" button 52, an "upgrade" button 54, a "refer a friend" button 56, and a "delete account" button 58. Selection of the "settings" button 52 directs the user to an interface for viewing and/or changing any changeable settings of the app. Selection of the "upgrades" button 54 directs the user to an interface for upgrading the app and/or purchasing any latest features of the app that may be available. Selection of the "refer a friend" button 56 directs the user to an interface for sending a link for downloading the app via email or text, using the native email and/or text applications of the user computing device 12. Selection of the "delete account" button 58 directs the user to an interface for deleting the user's user account from the server 14.

An example of an inbox screen 60 is shown in FIG. 5. As shown, the inbox screen 60 may display a plurality of selectable soft buttons, including a "messages" button 62, a "compose message" button 64, and a "contacts" button 66. Upon selection of the "messages" button 62, a list of any messages, such as text or other media messages, including messages with an attached photo, video, and/or audio file, or combination thereof, is displayed, wherein each of the list of messages is a message received from another user of the system 10, operating a second user computing device 12 coupled to the server 14. Such messages may be sent from any user computing device 12 coupled to the server 14 and directed for storage on the server 14, wherein each message is associated with a user account on the server 14 for viewing by the user corresponding to the user account on the user's computing device 12 through the app operating on the user computing device 12. In this way, a first user may send a message to a second user via the server 14. In some embodiments, a first user may send a message to a plurality of other users via the server 14. Upon selection of the "compose message" button 64, the user is directed to an interface for composing and sending a message to another user, or to a plurality of users, of the system 10, via the server 14.

In some embodiments, upon selection of the "contacts" button 66, a list of other users of the system 10 is displayed. In some embodiments, the list of other users may be limited to those users for which contact has been requested by another user and accepted by the user, thereby defining a restricted list of contacts of the user. In some embodiments, selection of the "contacts" button 66, a list of contacts, including contacts entered and stored by the user, wherein the list of contacts includes contacts of the user that are not users of the system 10. In some embodiments, the user may select a contact or other user from the list of contacts or other users, in response to which the contacts screen is displayed. An example of a contacts screen 70 is shown as FIG. 6. As shown, the contacts screen 70 may display contact information 72 associated with the contact or other user selected, such as an address, phone number, and email address, for example, and a plurality of selectable soft buttons, including a "share website to visit" button 74, and a "send message" button 76. Upon selection of the "share website to visit" button 74, the user is directed to an interface for selecting and sharing with the selected contact or other user, a link to a third-party website, such as may be selected from a list of third-party websites stored on the server 14. As an example of practical application, the user may see a photo of an item on the third-party website and wish to send a link to the third-party website with the photo to another user of the system 10 so that the other user may use the system 10 to determine the color of the item in the photo and use that color to match with a color of another item. Upon selection of the "send message" button 76, the user may be directed to an interface for sending a message containing a photo, with a brief textual description of the photo, to a contact or another user of the system 10, wherein the photo may contain an image of an item to be color matched. In some embodiments, the message may also contain an audio and/or video file attachment. In some embodiments, the message, including the photo and description, may be sent to a plurality of other contacts or other users of the system 10.

An example of a saved files and photos screen 80 is shown as FIG. 7. As shown, the saved files and photos screen 80 may display a plurality of selectable soft buttons, including a "saved files" button 82, a "saved photos" button 84, a "favorite websites" button 86, a "history of purchases" button 88, and a camera icon button 90. Upon selection of the "saved files" button 82, the user may be directed to an interface for selecting and grouping together multiple photos as small collections. For example, the user may group together 2 to 4 photos that are related in some way, to facilitate viewing of the photos together as a group on the display of the user computing device 12. As an example, the user may wish to group together photos of clothing and/or accessory items that are of the same color or coordinated color. Upon selection of the "saved photos" button 84, the user may be directed to an interface for uploading photos for storage on the server 14, viewing the photos, and retrieving the photos for use with other aspects of the system 10. Upon selection of the "favorite websites" button 86, the user may be directed to an interface for storing a list of favorite websites of the list of third-party websites that are connected to or otherwise interact with the system 10. As a practical application, the user may be browsing one such website and encounter a photo of an item on the website that the user wishes to remember, or the user may like the website for browsing and/or shopping on the website. The user may select the website for inclusion in the list of favorite websites. In some embodiments, the third-party website may include an interface or selectable soft button on the website for the user to save the website to the list of favorite websites in response to user input on the website. Upon selection of the "history of purchases" button 88, the user may be directed to an interface for viewing a list of purchases made on any of the third-party websites, wherein each item in the list of purchases may include the URL of the website, the date and/or time of purchase, amount of the purchase, and a photo and/or description of the item purchased. The user may view the photo to remember the color of the item, and/or store the photo on the server 14 for later use with other aspects of the system 10. The user may select an item from the list in order to be directed back to the website where the item was purchased. Selection of the camera icon button 90 opens the native camera application on the device, whereupon the user may take a photo of an item and store the photo for later use with other aspects of the system 10.

In some embodiments, any of the screens of the user interface on the user computing device 12 may include any of a variety of selectable soft buttons for navigation to other screens of the user interface, as well as any of a variety of selectable soft buttons for accessing any of the other features and/or aspects of the system 10 on the user computing device 12. Any of the screens, such as the profile screen 40 or the contacts screen 70, for example, may include a selectable "match that" soft button 92. Upon selection of the "match that" button 92, the user may be directed to an interface for color matching objects in two or more photos. For example, through the interface, the user may select a first photo from the saved photos on the server 14 and a second photo from the saved photos on the server 14 for simultaneous viewing on the display of the user computing device 12. The user may then control a cursor or use other means, such as by touching the display if the user computing device 12 comprises a touch screen display, to locate a first pinpoint on the first photo and a second pinpoint on the second photo. The server 14 may be programmed to automatically process the color codes of each of the first and second pinpoints, calculate the degree of matching between the two colors, expressed as a matching percentage from 0% to 100%; and send the matching percentage to the user computing device 12 for display on the user computing device 12.

In another example of use of the system 10, a woman may have a pair of shoes of a particular color at home and wish to purchase a handbag of the same color at a store. The woman may see a handbag at the store and be unsure of whether it is of the same color as the pair of shoes at home. The woman may use the system 10 to retrieve a photo of the pair of shoes, previously stored on the server 14, then use the user computing device 12 to take a picture of the handbag at the store. The system 10 may be used, as described generally above, to determine the degree of matching between the color of the pair of shoes and the color of the handbag, expressed as a percentage from 0% to 100%. If the degree of matching is at or near to 100%, then the woman may be assured that the handbag is a good color match to the pair of shoes. If the degree of matching is at or closer to 0%, then the woman will know that the handbag is not a good color match to the pair of shoes and may wish to continue searching for another handbag that is a better color match.

In another example of use of the system 10, a man may have a belt of a particular color at home and wish to purchase a wallet of the same color at a store. The man may see a wallet at the store and be unsure of whether it is of the same color as the belt at home. The man may use the system 10 to retrieve a photo of the belt, previously stored on the server 14, then use the user computing device 12 to take a picture of the wallet at the store. The system 10 may be used, as described generally above, to determine the degree of matching between the color of the belt and the color of the wallet, expressed as a percentage from 0% to 100%. If the degree of matching is at or near to 100%, then the man may be assured that the wallet is a good color match to the belt.

If the degree of matching is at or closer to 0%, then the man will know that the wallet is not a good color match to the belt and may wish to continue searching for another wallet that is a better color match.

In yet another example of use of the system 10, a bride-to-be may have chosen a color scheme, including a particular color, for her upcoming wedding reception. The bride-to-be may have seen an item, such as a pillow, for example, of that particular color on a website. The bride-to-be may save the website URL to the system 10 and send a copy of the URL, with a description of the pillow, to a plurality of wedding reception invitees. An invitee may wish to purchase a set of bed sheets, of the same color as the pillow, as a wedding gift for the bride-to-be. The invitee may use the system 10 to view a picture of the pillow and perform a color match, as described generally above, with a picture of a set of bed sheets the invitee may wish to purchase. If the color match is at or near to 100%, then the invitee may be assured that the set of bed sheets is a good color match to the pillow. If the degree of matching is at or closer to 0%, then the invitee will know that the set of bed sheets is not a good color match to the pillow and may wish to continue searching for another set of bed sheets that is a better color match.

In some embodiments, a color match may be performed between a first photo and a plurality of other photos displayed simultaneously on a screen of the user computing device 12. For example, a user may wish to color match a first photo, by comparing it to three other photos, to determine which of the three other photos is the best match with the first photo. Although not intended to be limiting, it may be practical to color match up to three other photos with the first photo in a single color match, depending on the size and resolution of the display of the user computing device 12. For example, a large display may accommodate simultaneous display of more photos to be color matched than a small display may accommodate.

As described above, the server 14 may be further programmed to store texture data, including visual representations of various textures of various objects, in digital format. In some embodiments, the server 14 may store texture data in groups of textures associated with various common objects. For example, the server 14 may store texture data in a list of textures of which a pair of pants may be commonly made, such as cotton, denim, polyester, suede, rayon, or the like. The server 14 may store texture data in groups of textures associated with various common objects, such as, but not limited to, shirts pants, suits, ties, shoes, sneakers, hats, belts, eyewear glasses, pocketbooks, make-up, lip stick, nail polish, and some jewelry. The server 14 may store texture data associated with various fabrics, such as, but not limited to, cotton, denim, silk, leather, polyester, linen, suede, cashmere, and rayon. The server 14 may store texture data associated with various other materials, such as, but not limited to, wood, metal, plastic, granite, steel, rubber, glass, tin, and porcelain.

In some embodiments, the app may be programmed to display a user interface wherein the user may select a digital photo of an object of a first texture or material. The server 14 may be further programmed, in response to user input to the user computing device 12, to morph the image of the object to display the object with a different texture, or of a different material. For example, the user may utilize the system 10 to edit a photograph of a cotton shirt of a particular color to display the shirt as a denim shirt of the same color. For example, the user may have a blue cotton shirt and the user may want to know what the shirt would look like if it were made of denim of the same blue color. The user may take a photo of the blue cotton shirt and use the system 10 to morph the photo to display the shirt with a denim texture of the same color. This aspect of the system 10 may be useful, in conjunction with the color matching aspect described above, to allow the user to more correctly visualize an item to be color matched if the item were made of a different material.

In addition, in some embodiments, the app may be programmed to display a user interface wherein the user may select a digital photo of an object of a first color. The server 14 may be further programmed, in response to user input to the user computing device 12, to morph the image of the object to display the object with a different color. For example, the user may utilize the system 10 to edit a photograph of a shirt of a first color to display the shirt in a different color. For example, the user may have a shirt of a first color and the user may want to know what the shirt would look like if it were of a second color. The user may take a photo of the shirt and use the system 10 to morph the photo to display the shirt in a different color. This aspect of the system 10 may be useful, in conjunction with the color matching aspect described above, to allow the user to more correctly visualize an item to be color matched if the item were of a different color.

Figure 8:
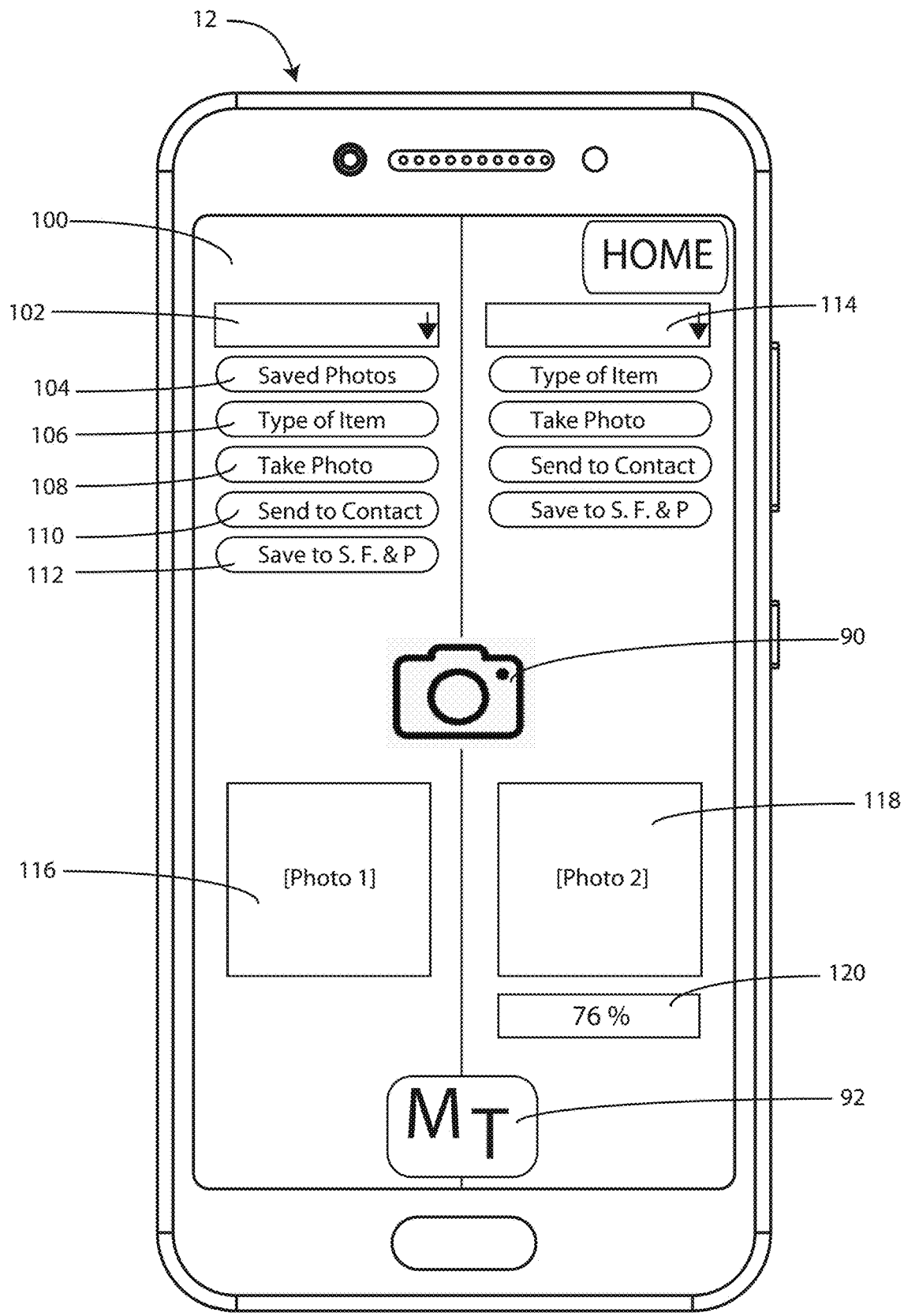
FIG. 8 is a front view of a user computing device operating a color matching app of a color matching system to display a match that screen of the app, according to an embodiment.

An example of a match that screen 100 is shown as FIG. 8. As shown in FIG. 8, a match that screen may be divided between a left side, corresponding to a first photo 116, and a right side, corresponding to a second photo 118. On the left side of the match that screen 100 may be displayed a selectable first drop tab 102. Upon selection of the first drop tab 102, a list of selectable soft buttons may be displayed, including, without limitation, a "Saved Photos" button 104, a "Type of Item" button 106, a "Take Photo" button 108, a "Send to Contact" button 110, and a "Save to S. F. & P" button 112. Selection of the "Saved Photos" button 104 displays a list of photos previously saved to the server 14 and associated with the user account of the user, wherein the user may select a photo from the list of photos for display as the first photo 116 on the match that screen 100. Alternatively, the user may select the "Take Photo" button 108 to open the native camera function of the user computing device 112 to take a new photograph to be saved to the server 14 and displayed as the first photo 116 on the match that screen 100. Selection of the "Type of Item" button 106 opens a user interface for inputting the type of item displayed as the first photo 116 corresponding to a type of item previously stored on the server 14 and associated with a list of common materials and/or textures for that item (also stored on the server 14, as described above). In any case, once the first photo 116 is displayed, a means may be provided for the user to zoom in on a particular portion of the item in the first photo 116 in order to select a particular color of that portion of the item. For example, the interface may provide for the user to zoom in by directing a cursor, or by touching the screen, in the case of a user computing device 12 having a touch screen. Upon selecting the color, the selected color may be displayed, for example, as a zoomed-in image of the color, or by showing the color in place of the first photo 116, or by flashing an image of the color for a short burst of time or alternatively with the first photo 116. It is understood that selection and display of the selected color from the first photo 116, may be accomplished by any of a variety of means known now or in the future. Furthermore, the selected color may be changed, such as by the user selecting a different portion of the item shown in the first photo 116. Selection of the "Send to Contact" button 110, opens an interface through which the user may send a digital copy of the first photo 116 as an attachment in a message to another user or contact. The message may also contain the zoomed-in color selected by the user. Selection of the "Save to S. F. & P" button 112 opens an interface for the user to save the first photo 116 to the server for later retrieval.

A similar set list of selectable soft buttons may be displayed as a result of the user selecting a second drop button 114, corresponding to a second photo 118. In a similar manner, as described above regarding selection and display of the first photo 116, on the left side of the match that screen 100, including selection, by the user, of a zoomed-in color of the image in the first photo 116, the user may also select and display the second photo 118 on the right side of the match that screen 100, as well as a corresponding zoomed-in color from an image in the second photo 118.

In some embodiments, as shown in FIG. 8, the match that screen 100 may include camera button icon 90 for opening the native camera application of the user computing device 112, for selection of a picture for display as the first photo 116 or the second photo 118.

The match that screen 100 may include a selectable "Match That" button 92, as shown in FIG. 8. The user may select the "Match That" button 92 after having selected for display, first photo 116 and second photo 118, including corresponding zoomed-in colors associated with each of the first and second photos 116 and 118. Upon selection of the "Match That" button 92, the server 114 performs an analysis of the zoomed-in colors to determine the color codes of the respective zoomed-in colors for comparison, calculates the degree of matching between the two colors, expressed as a matching percentage from 0% to 100%, and sends the matching percentage to the user computing device 12 for display on the user computing device 12. For example, the matching percentage 120 is shown in FIG. 8 as 76%, displayed just below the second photo 118 on the match that screen 100. This represents the matching of the zoomed-in color of the second photo 118 to the zoomed-in color of the first photo 116. If the matching percentage 120 is equal to or close to 100%, then the color of the second photo 118 is a close match to the color of the first photo 116. If the matching percentage 120 is equal to or close to 0%, then the color of the second photo 118 is not a close match to the color of the first photo 116.

Figure 9:
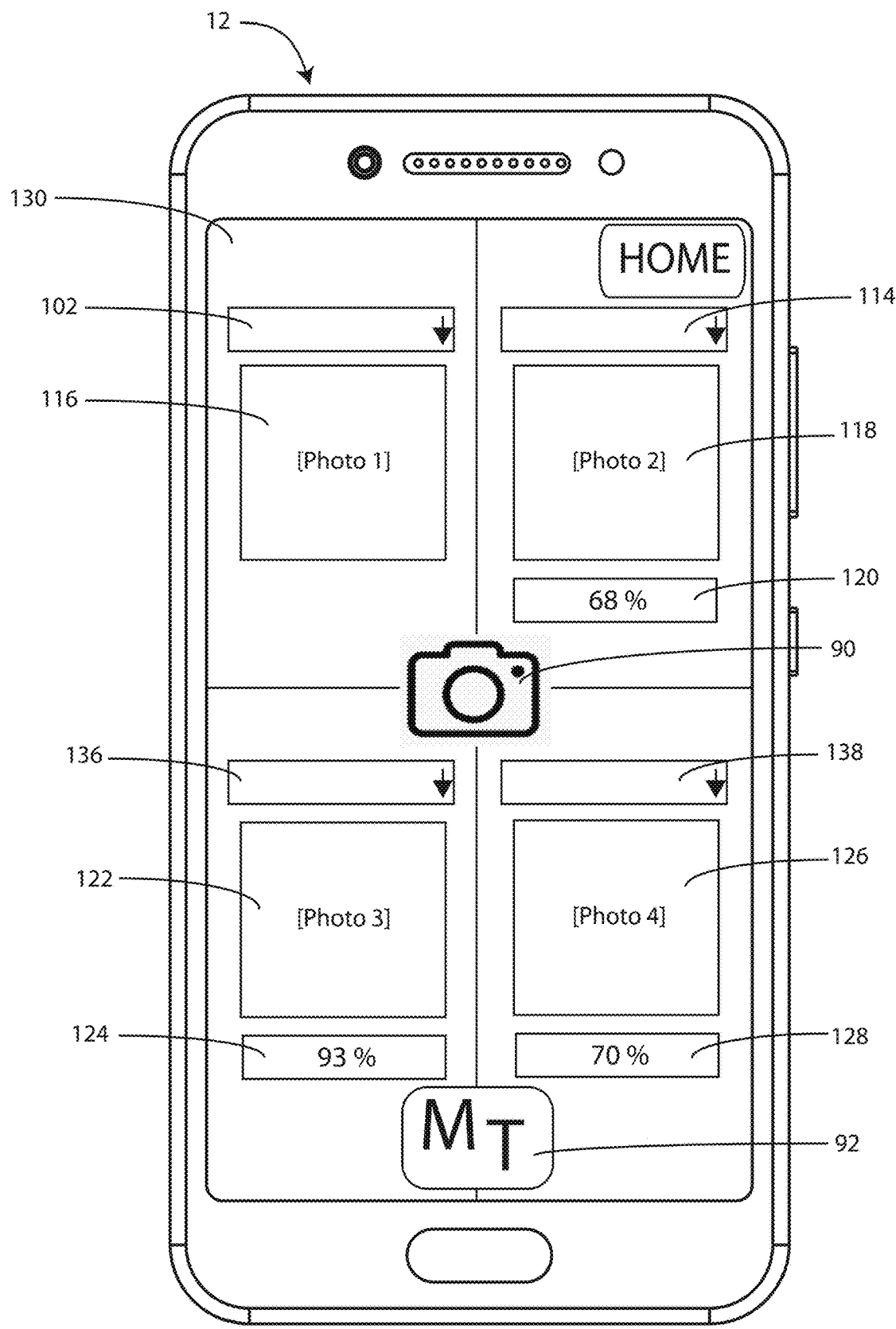
FIG. 9 is a front view of a user computing device operating a color matching app of a color matching system to display a match that plus screen of the app, according to an embodiment.

An example of a match that plus screen 130 is shown in FIG. 9. The match that plus screen 130 is very similar to the match that screen 100, shown in FIG. 8, with the exception that the match that plus screen 130 provides for selection and display of additional photos for comparison to the first image 116. As shown in FIG. 9, the first photo 116 is displayed in the upper left quadrant of the match that plus screen 130 and the second photo 118 is displayed in the upper right quadrant. Additionally, a third photo 122 is displayed in the lower left quadrant and a fourth photo 126 is displayed in the lower right quadrant of the match that plus screen 130. Upon selection of the match that button 92, a matching percentage is shown for each of the second, third, and fourth photos 118, 122, and 126, representing the degree of matching of each corresponding photo to the first photo 116. As shown in FIG. 9, the second photo matching percentage 120 indicates the degree of matching of the second photo 118 to the first photo 116, the third photo matching percentage 124 indicates the degree of matching of the third photo 122 to the first photo 116, and the fourth photo matching percentage 128 indicates the degree of matching of the fourth photo 128 to the first photo 116. In a practical application, the first photo 116 is always the photo to be compared to with the other photos 118, 122, and 126. As shown in FIG. 9, the third and fourth drop down buttons 136 and 138 correspond to the first and second drop down buttons 102 and 114, with respect to the third and fourth photos 112 and 126.

Figure 10:
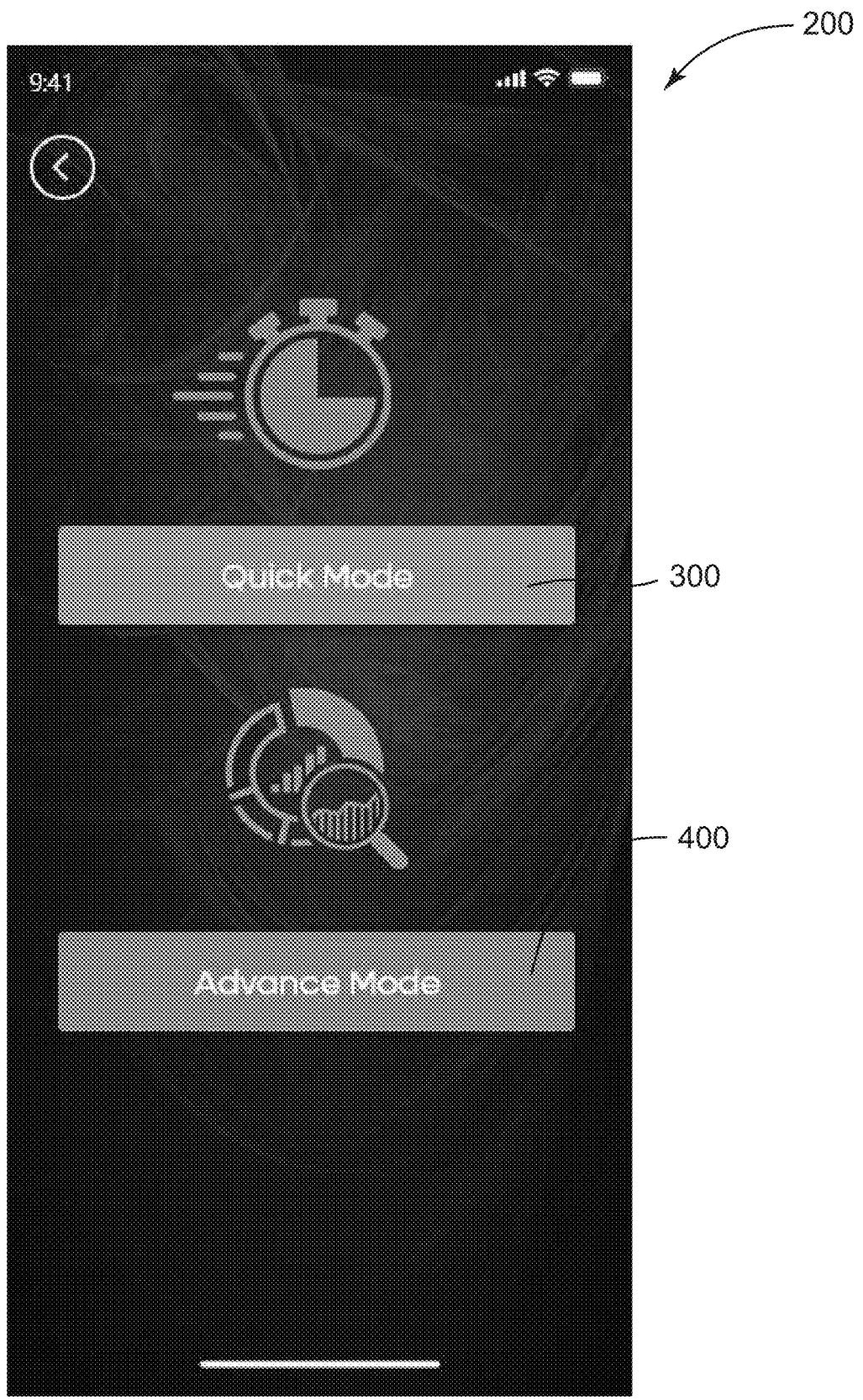
FIG. 10 is a view of a user interface for display on a user computing device operating a color matching system, according to an embodiment.

Referring additionally to the drawings. FIGS. 10-12I depict another embodiment of a color matching system 10. For example, the user computing device 12 of the system 10 may access the system 10 through operation of a mobile app, web app or the like. Accessing the system 10 allows the user computing device to establish communication with the server 14 in a manner established in FIG. 1. The server 14 may be programmed to perform all operations and send for display the various user interfaces that are depicted in FIGS. 10-12I. As shown in FIG. 10, the server sends for display a user interface 200 for selection of mode of operation of the system 10. The user interface 200 includes input button 300 for selecting "Quick Mode" operation of the system 10 and input button 400 for selecting "Advance Mode" operation of the system 10. The selection of button 300 directs the user to a series of user interfaces provided in FIGS. 11A-11H.

Figure 11A:
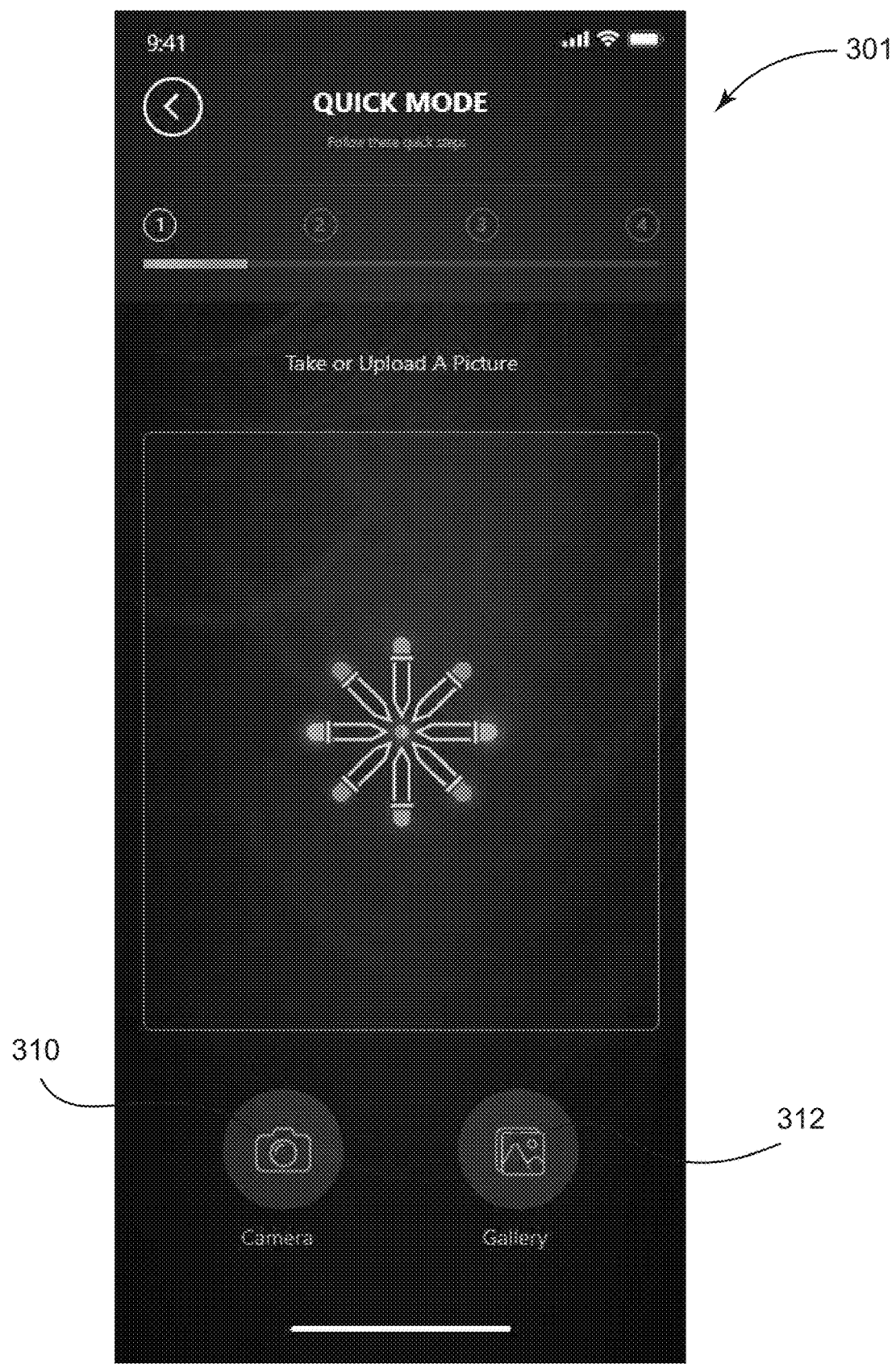
FIGS. 11A-11H are view of user interfaces for display on a user computing device operating a color matching system operating in a quick mode operation, according to an embodiment.
Figure 11B:
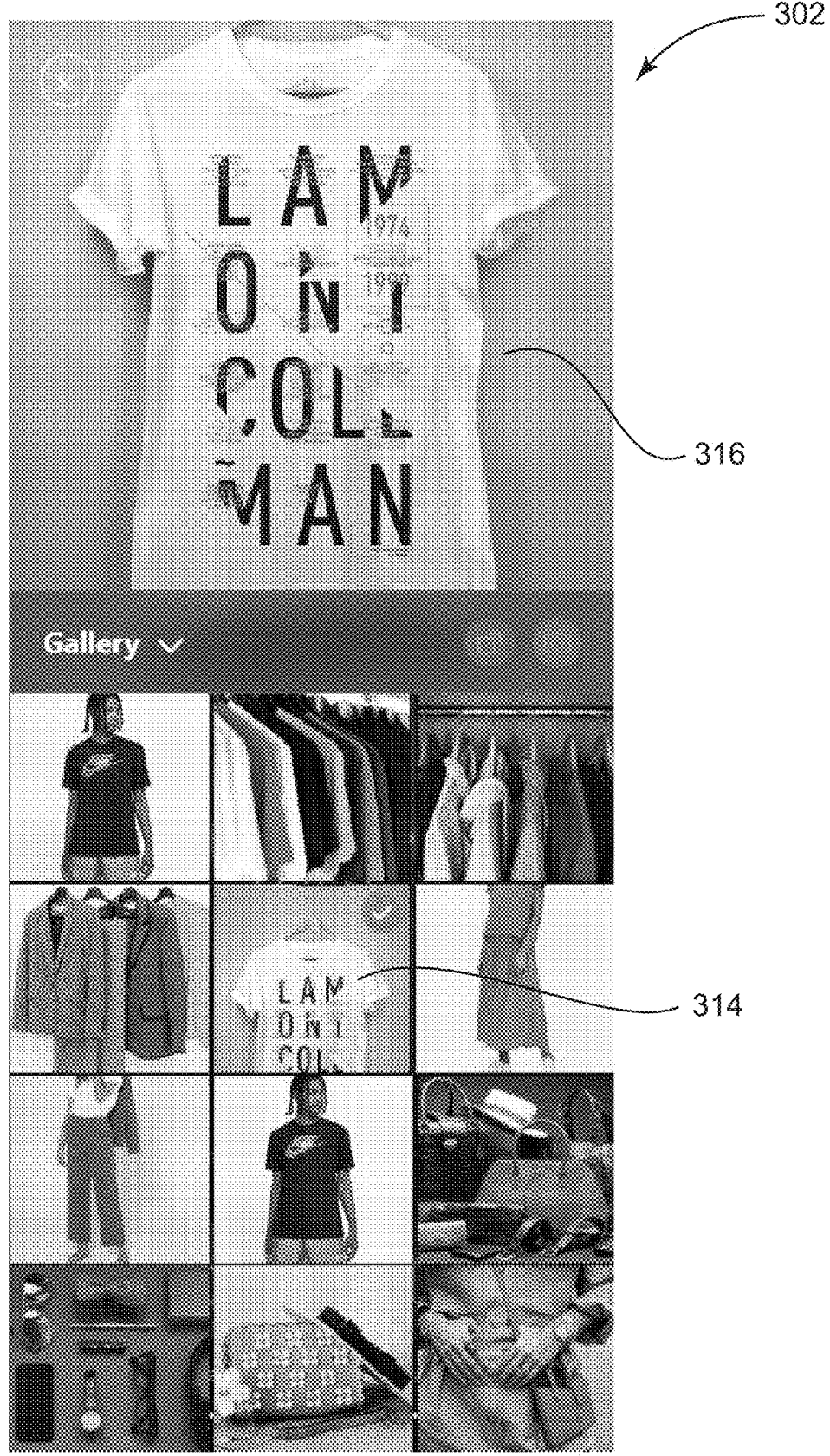
Figure 11C:
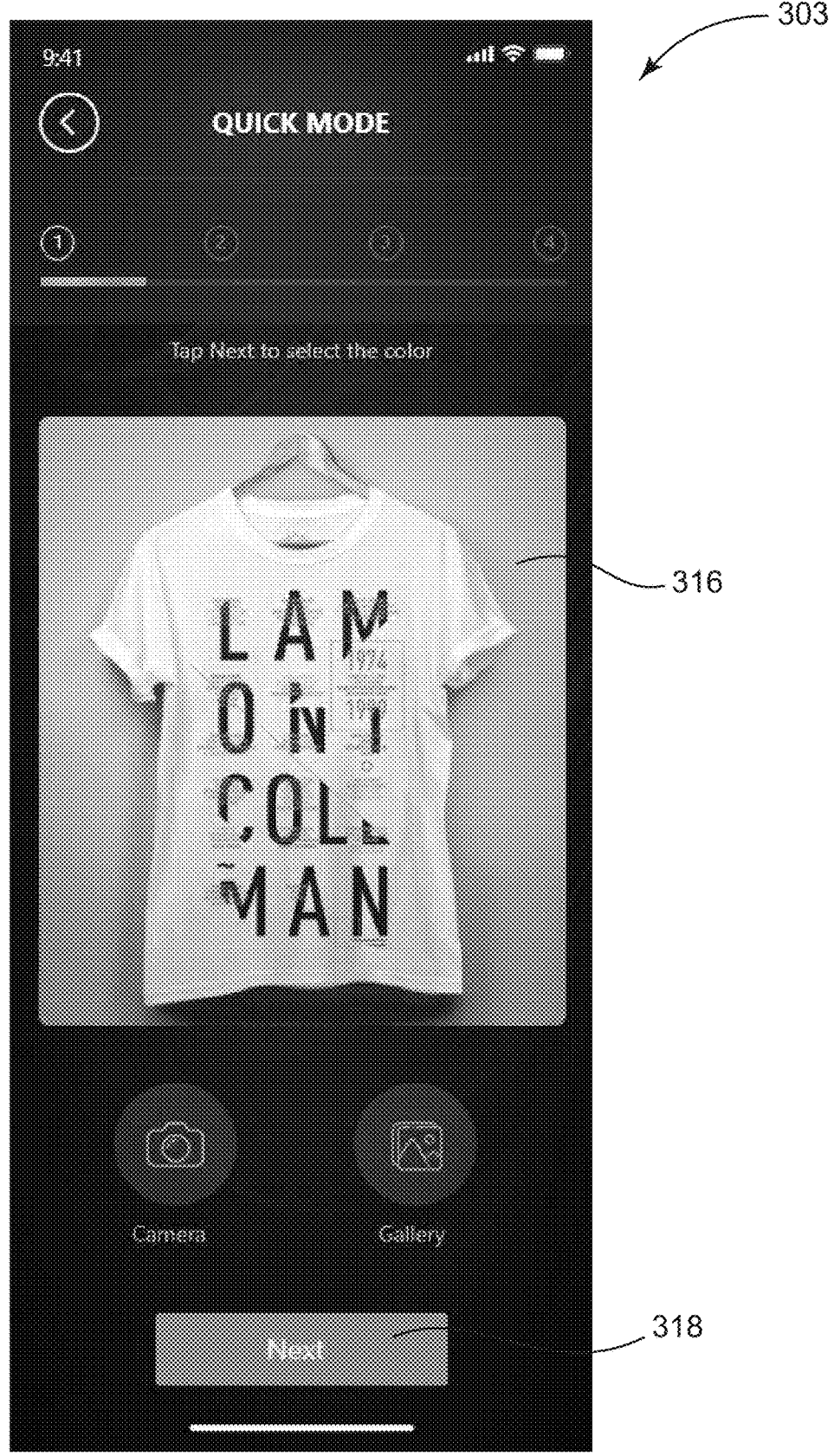
Figure 11D:
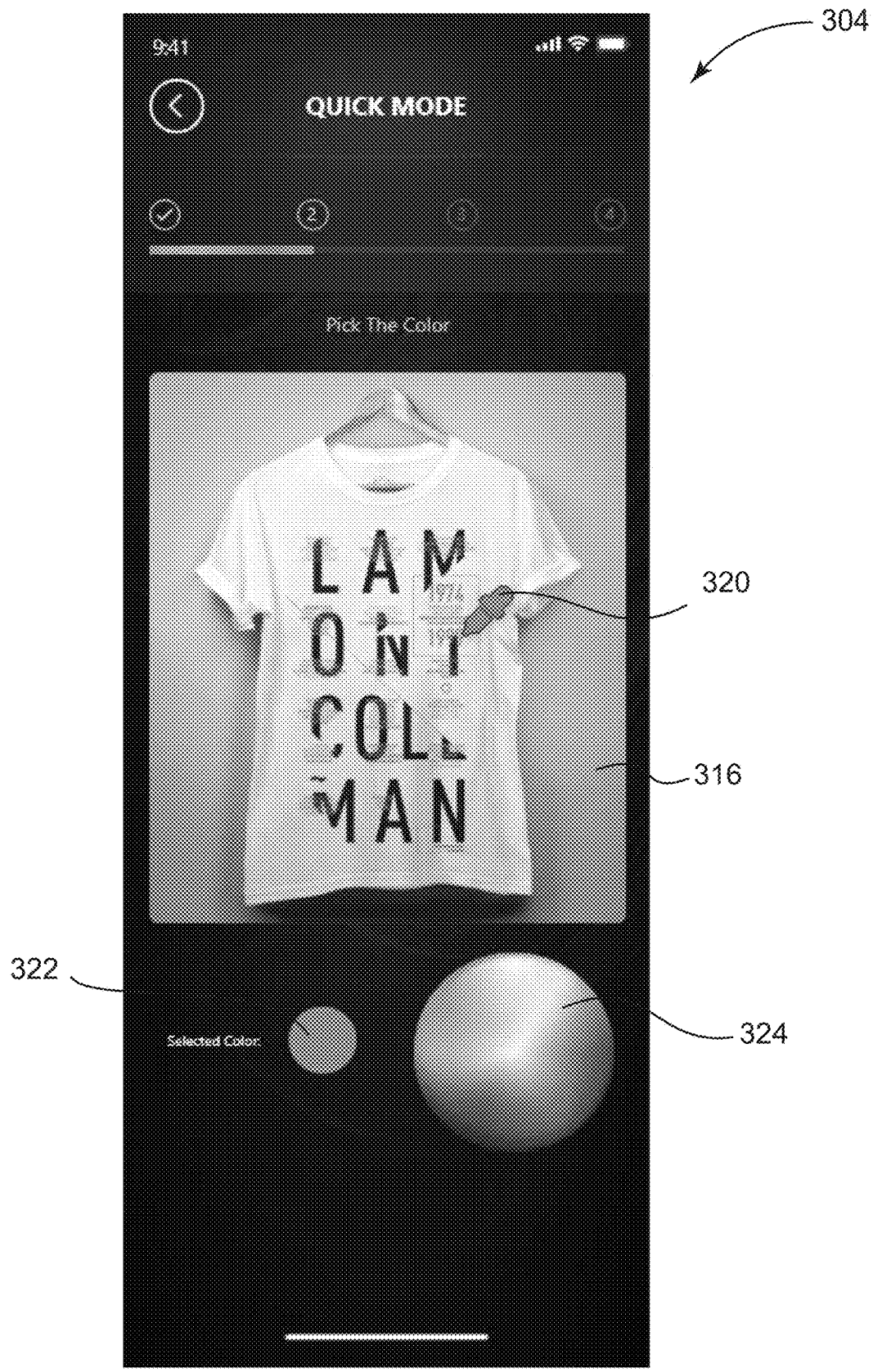
Figure 11E:
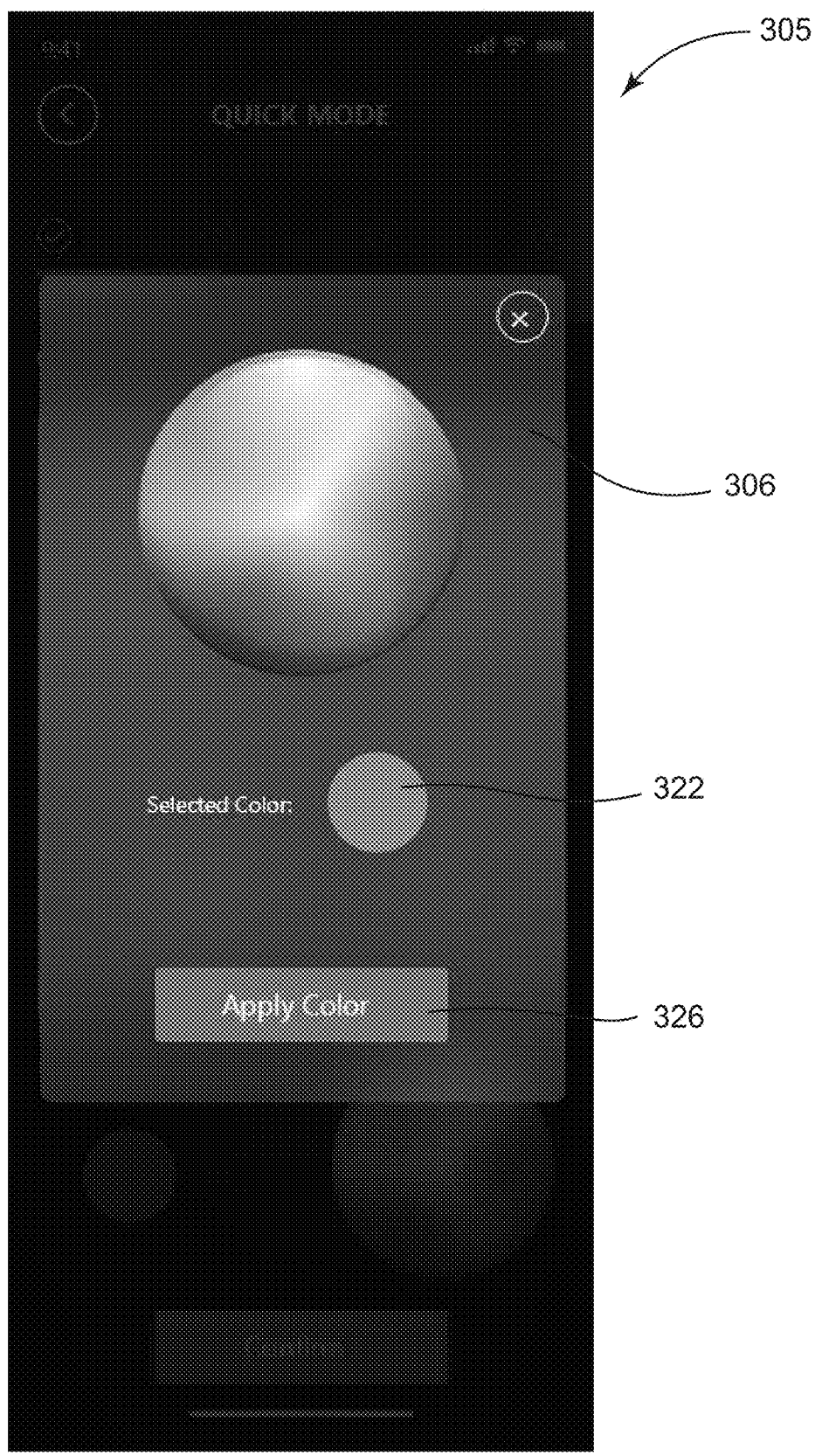
Figure 11F:
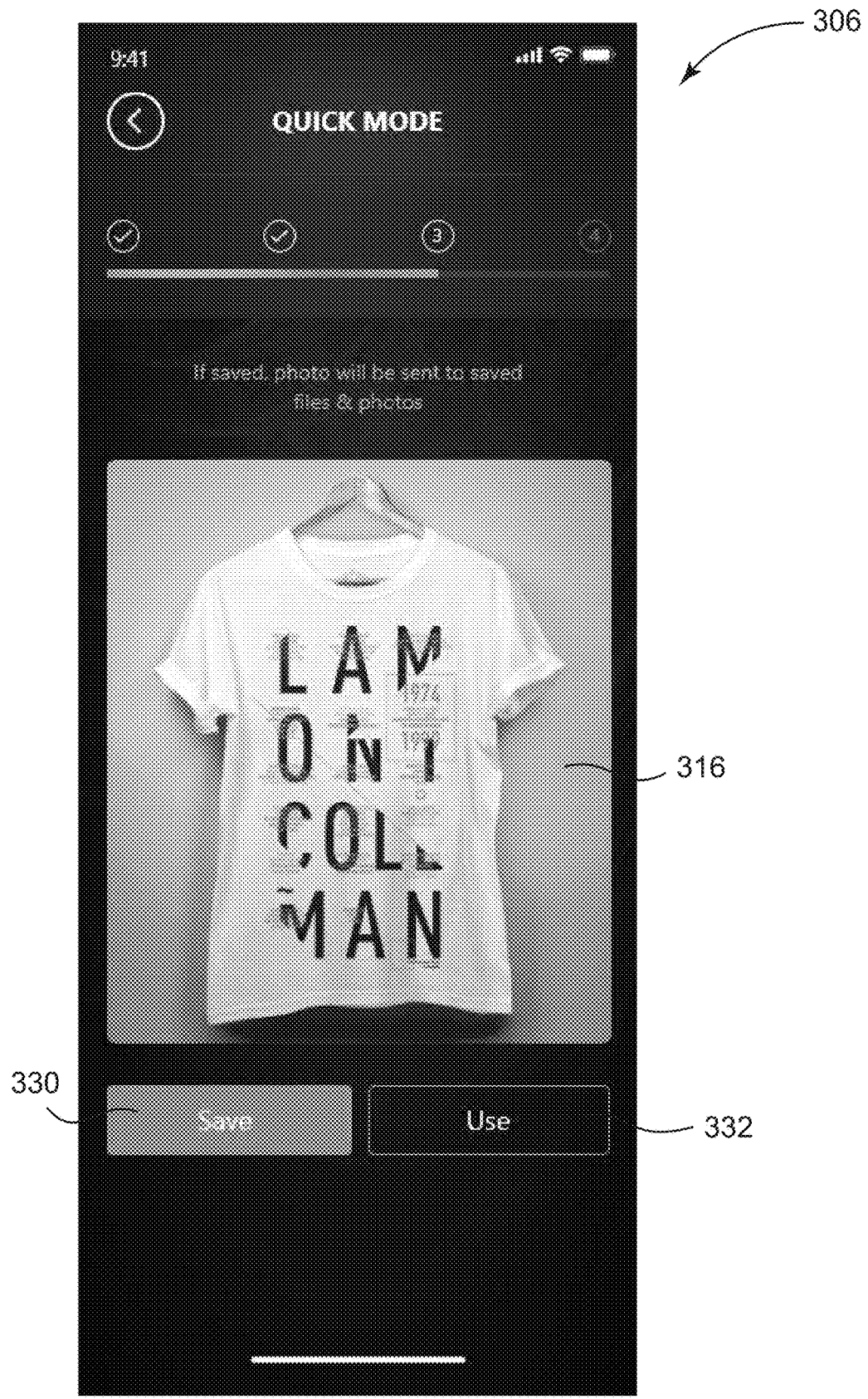

Referring to FIGS. 11A-11H operating in quick mode, the system 10 provides picture user interface 301 with two modes of uploading a picture for use by the system 10. The two modes of uploading pictures include a camera button 310 and a gallery button 312. The camera button 310 operates the camera of the user computing device 12 to actively take a photo and automatically input it into the system. As shown in FIG. 11B, the selection of the gallery button 312 directs a user to gallery user interface 302 with a one or more pictures to choose from that may be stored on the user computing device. The user may select gallery image 314 and the system automatically displays the selected image 316. Once an image is selected, the user interface 303 is displayed with the selected image 416 and a "Next" button 318 to proceed to the next step and upload the image, shown in FIG. 11C. The pick color user interface 304, shown in FIG. 11D, may then be displayed with the selected image 316 shown in the user interface. The user may interact with the selected image 316 with a pinpoint dropper 320 to select a particular color within the selected image 316. The selection of the color in the selected image 316 by use of the dropper 320 depicts a selected color 322. A color wheel 324 may also be displayed in the user interface 304 and can be selected if the user wishes to alter the selected color to make corrections or as desired, as shown in FIG. 11E. A user interface 305 may be displayed with the color wheel 324 and the selected color 322, wherein the selected color 322 may or may not be adjusted and then the user may select the "Apply Color" button 326 to set the color. The user may then be directed to a user interface 306, shown in FIG. 11F, that allows the user to save the selected image 316 using save button 330 or use the selected image 316 by selecting the use button 332. The selection of the use button 332 directs the user to additional operations. The user may go through the same process for a second selected image 340 and a second selected color 342.

Figure 11G:
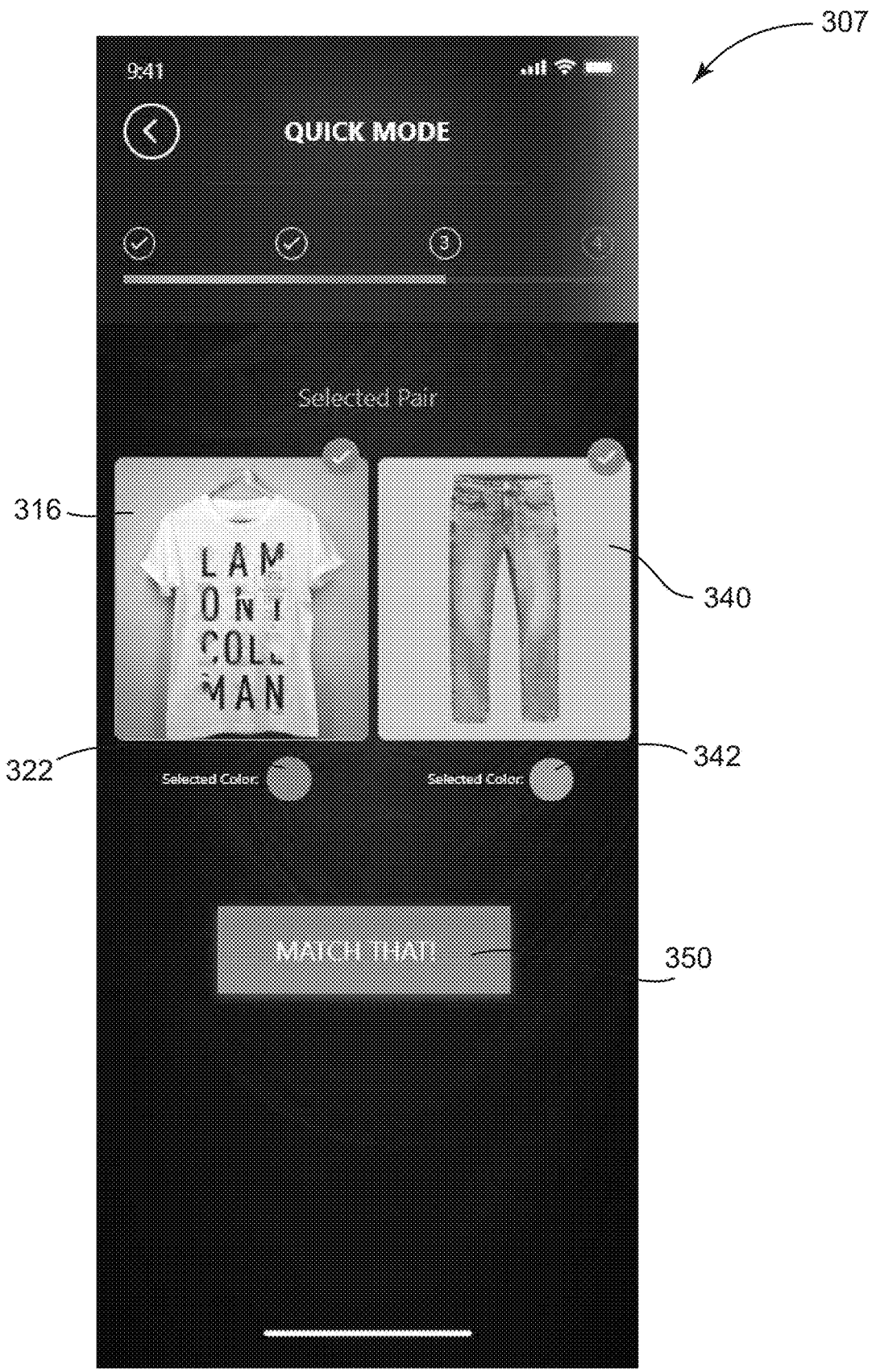
Figure 11H:
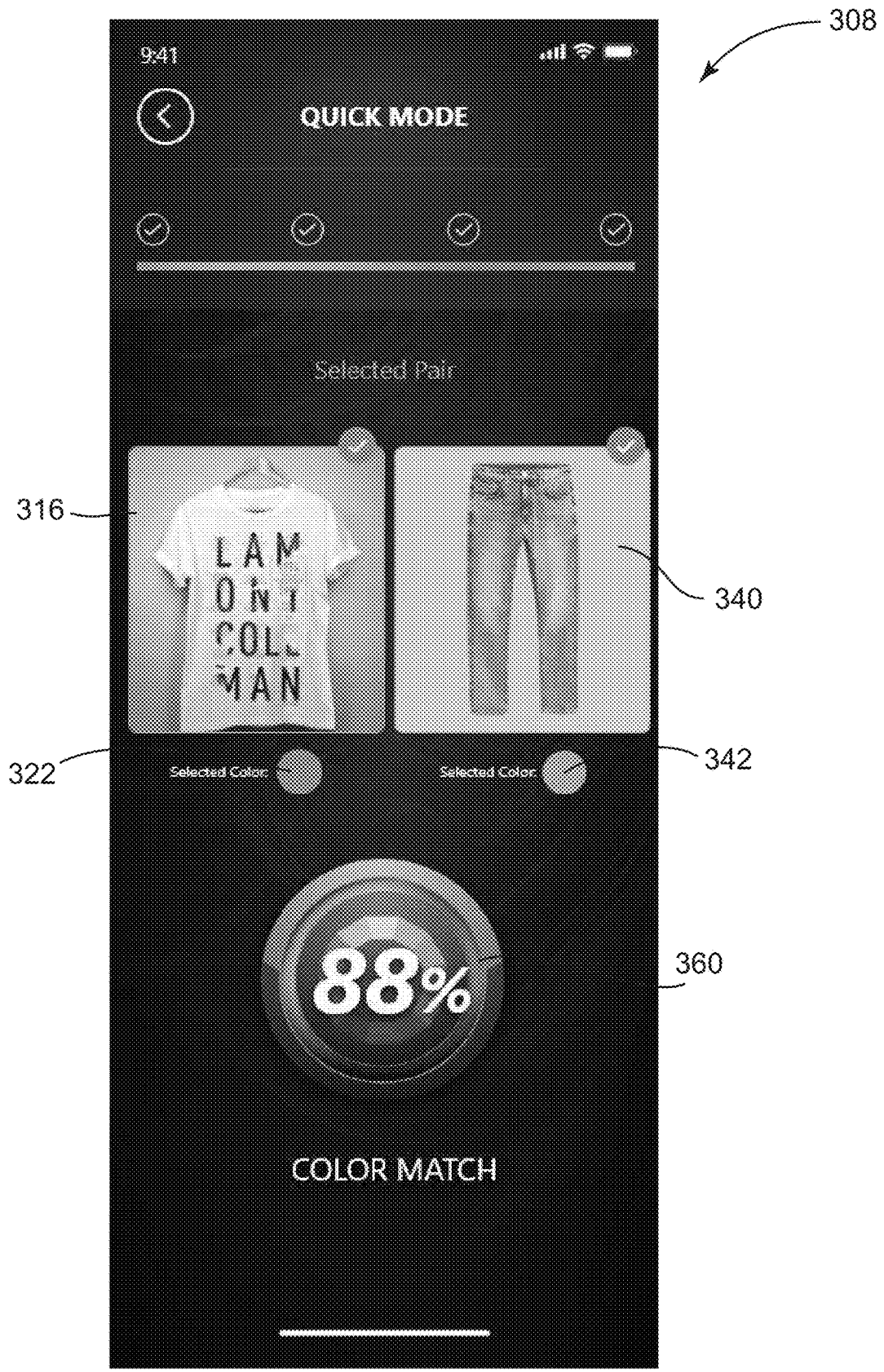

Referring to FIGS. 11G and 11H, the user computing device 12 may be directed to, or have displayed on it, the selected pair user interface 307 that shows the first selected image 316, the first selected color 322, the second selected image 340, and the second selected color 342, as shown in FIG. 11G. The user may then select a match button 350 that then initiates a color match process. The color match process operates to determine the degree of matching between the two selected colors 322 and 342, expressed as a matching percentage 360 from 0% to 100%; and send the matching percentage to the user computing device for display on the user computing device in color match user interface 308, such as the 88% match percentage 360 depicted in FIG. 11H. The user may then have the confidence based on the match percentage 360 to wear the clothes or confidence in the matching of the colors selected for other uses.

Embodiments may operate with additional features when the advance mode button 400 is selected in user interface 200 depicted in FIG. 10. The user may then be directed to user interfaces shown in FIGS. 12A-12I associated with the advance mode.

Figure 12A:
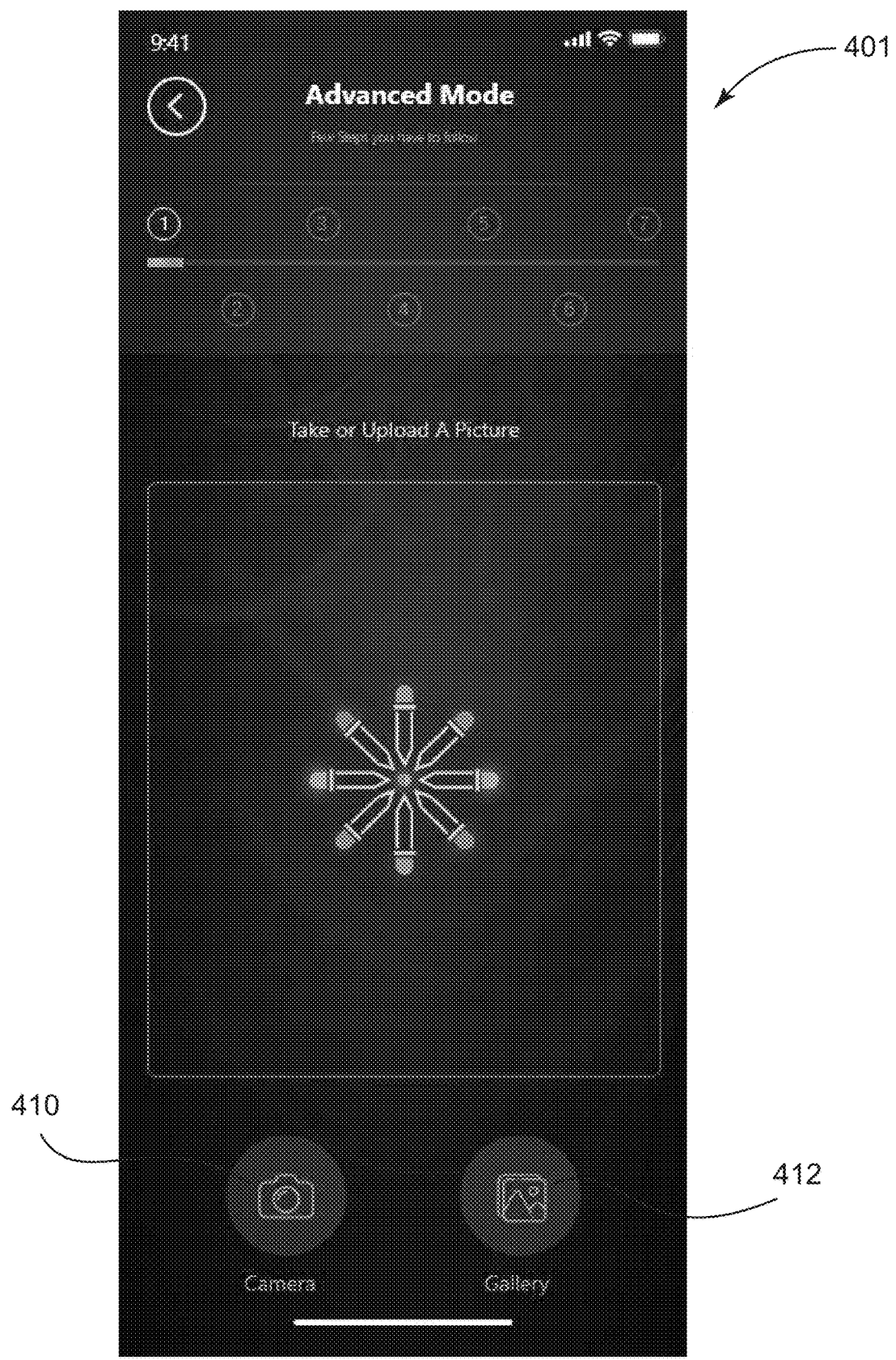
FIGS. 12A-12I are view of user interfaces for display on a user computing device operating a color matching system operating in an advance mode operation, according to an embodiment.
Figure 12B:
Figure 12C:
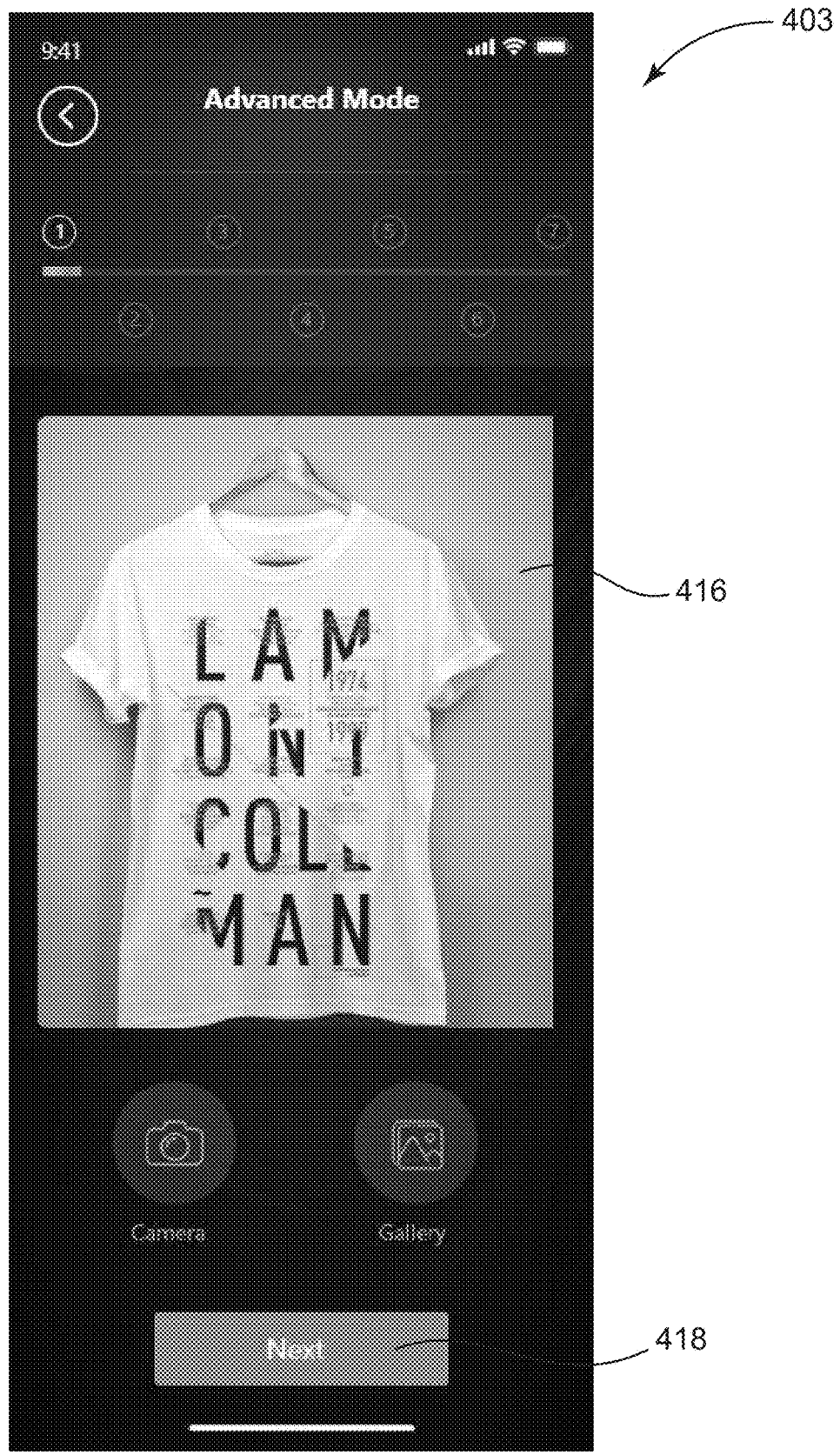
Figure 12D:
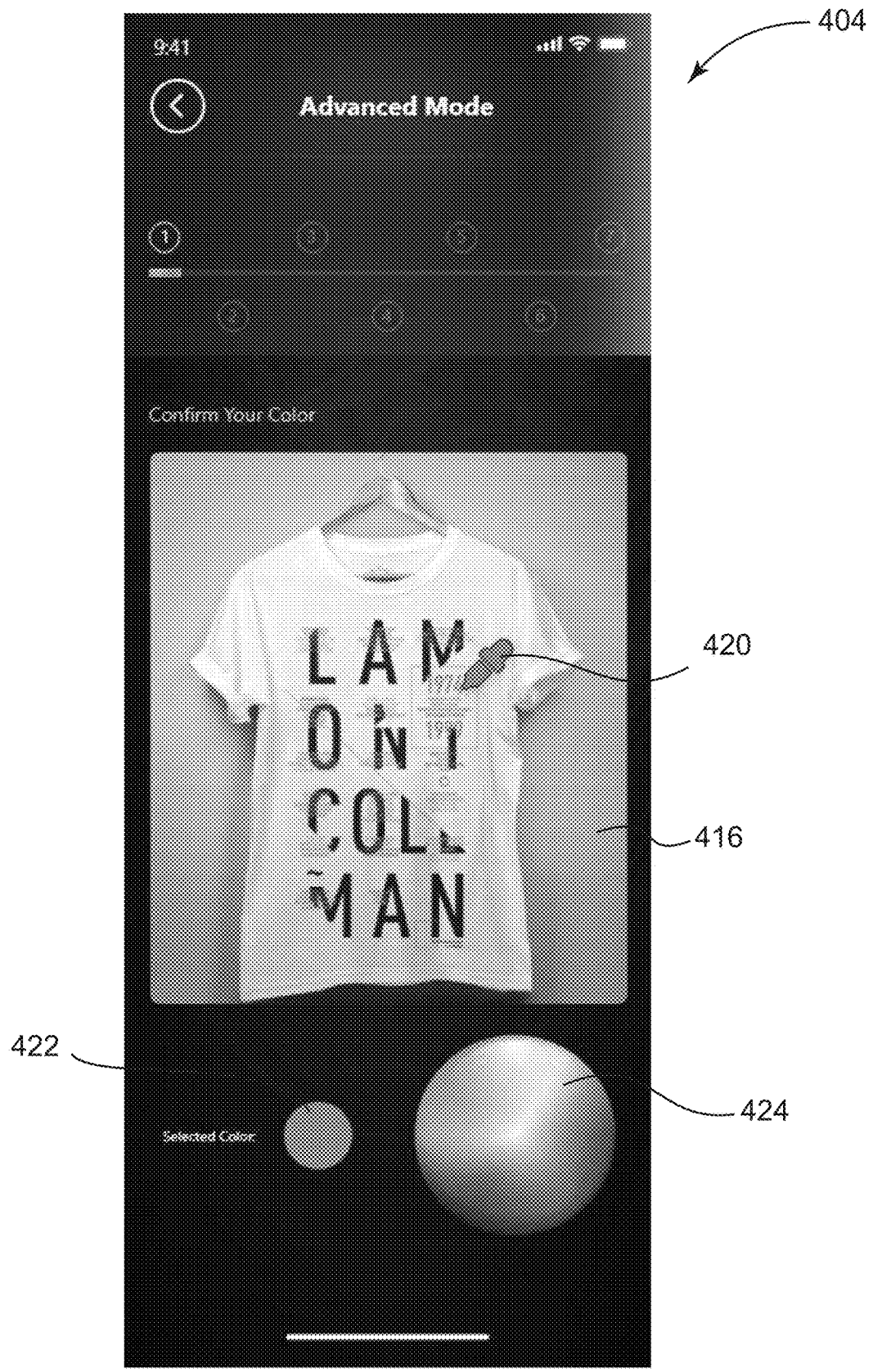
Figure 12E:
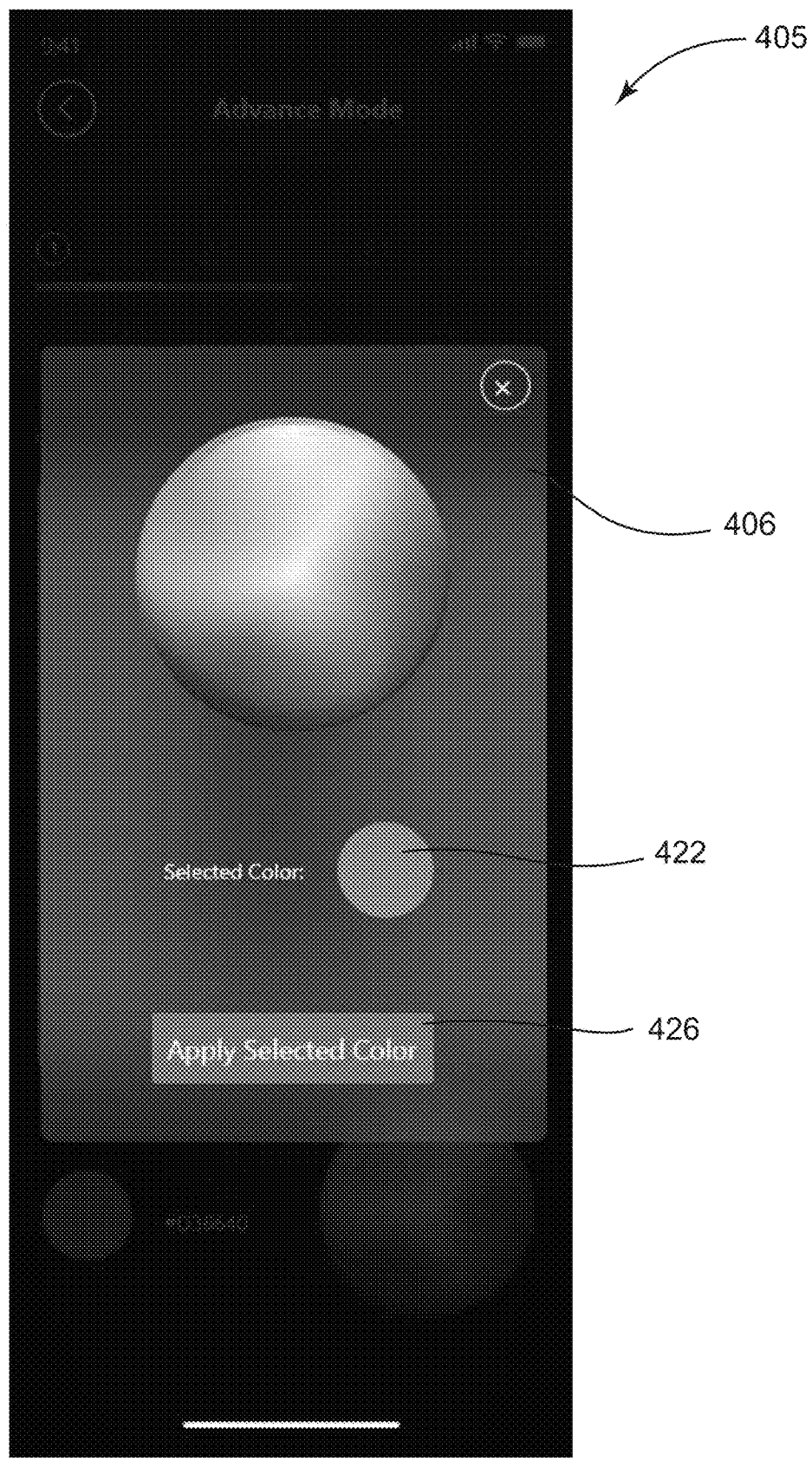
Figure 12F:
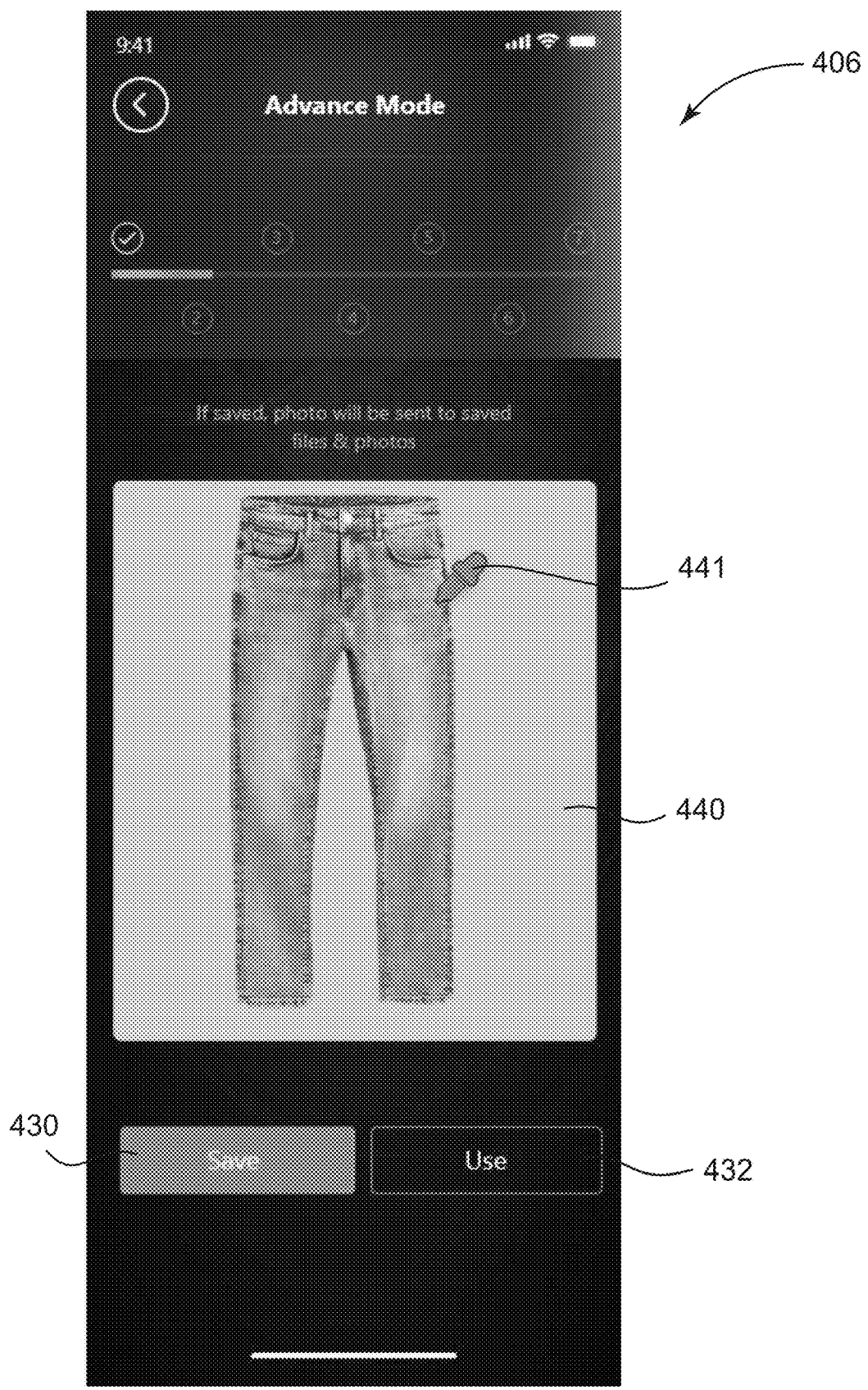

Referring to FIGS. 12A-12I operating in quick mode, the system 10 provides picture user interface 401 with two modes of uploading a picture for use by the system 10. The two modes of uploading pictures include a camera button 410 and a gallery button 412. The camera button 410 operates the camera of the user computing device 12 to actively take a photo and automatically input it into the system. As shown in FIG. 12B, the selection of the gallery button 412 directs a user to gallery user interface 402 with a one or more pictures to choose from that may be stored on the user computing device. The user may select gallery image 414 and the system automatically displays the selected image 416. Once an image is selected, the user interface 403 is displayed with the selected image 416 and a "Next" button 418 to proceed to the next step and upload the image, shown in FIG. 12C. The pick color user interface 404, shown in FIG. 12D, may then be displayed with the selected image 416 shown in the user interface. The user may interact with the selected image 416 with a pinpoint dropper 420 to select a particular color within the selected image 416. The selection of the color in the selected image 416 by use of the dropper 420 depicts a selected color 422. A color wheel 424 may also be displayed in the user interface 404 and can be selected if the user wishes to alter the selected color to make corrections or as desired, as shown in FIG. 12E. A user interface 405 may be displayed with the color wheel 424 and the selected color 422, wherein the selected color 422 may or may not be adjusted and then the user may select the "Apply Color" button 426 to set the color. The user may then be directed to a user interface 406, shown in FIG. 12F, that allows the user to save the selected image. FIG. 12F depicts the saving or using of a second selected image 440, that utilized dropper 441 to select a second selected color 440. The image 440 may be saved using save button 430 or use the selected image 440 by selecting the use button 432. The selection of the use button 432 directs the user to additional operations.

Figure 12G:
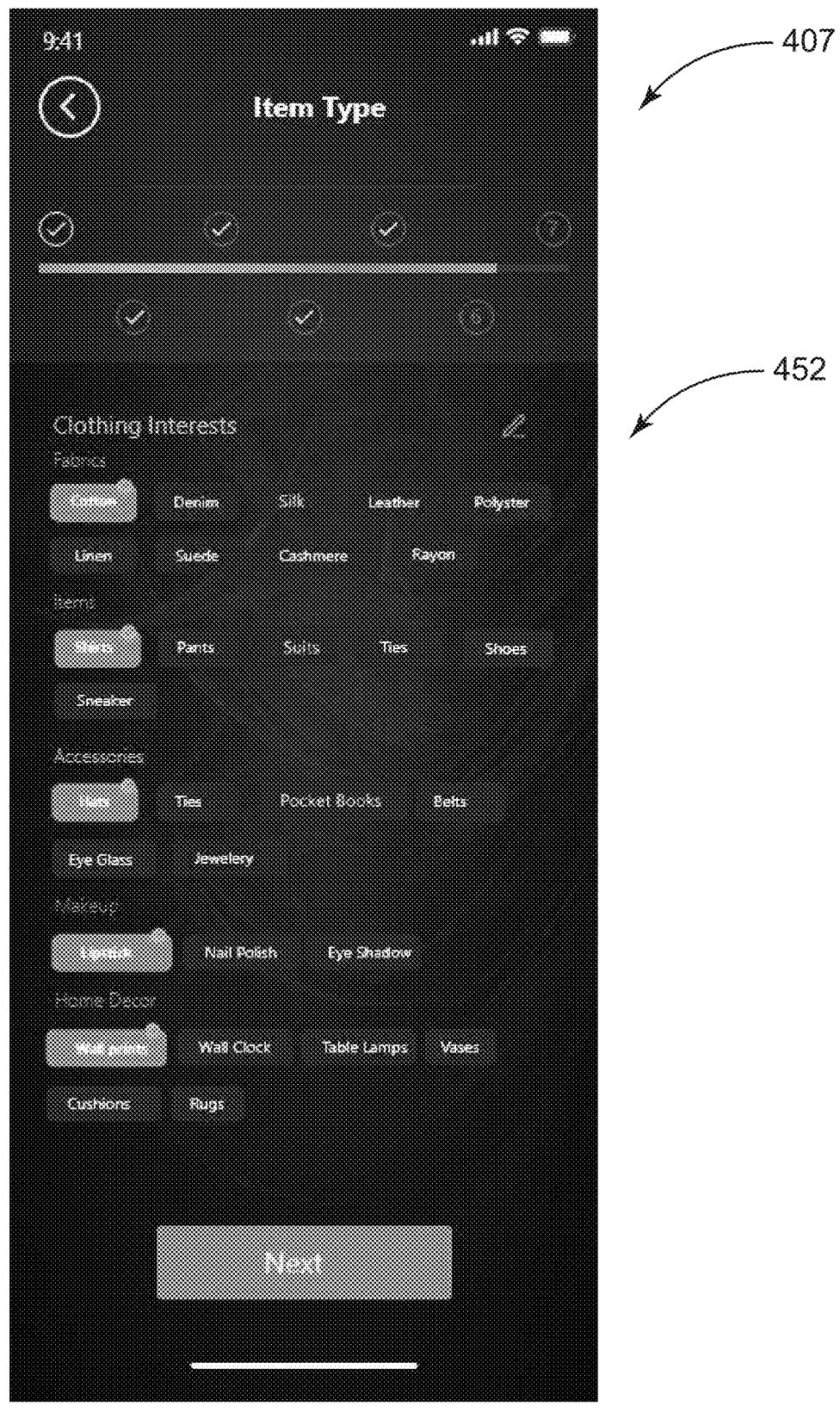

Referring to FIG. 12G, the user may be directed to an item type user interface 407. This user interface 407 may include selectable elements 452 for the items that are to be matched. These selectable items can adjust the matching determination of the images. For example and without limitation, the selectable elements 452 may include 1) fabrics, such as cotton, denim, silk, leather, polyester, linen, suede, cashmere, rayon and the like; 2) items, such as shirts, pants, suits, ties, shoes, sneakers and the like; 3) accessories, such as hats, ties, pocket books, belts, eye glasses, jewelry and the like; 4) make-up, such as lipstick, nail polish, eye shadow and the like; 5) home decor, such as wall prints, wall clock, table lamps, vases, cushions, rugs and the like; and so forth.

Figure 12H:
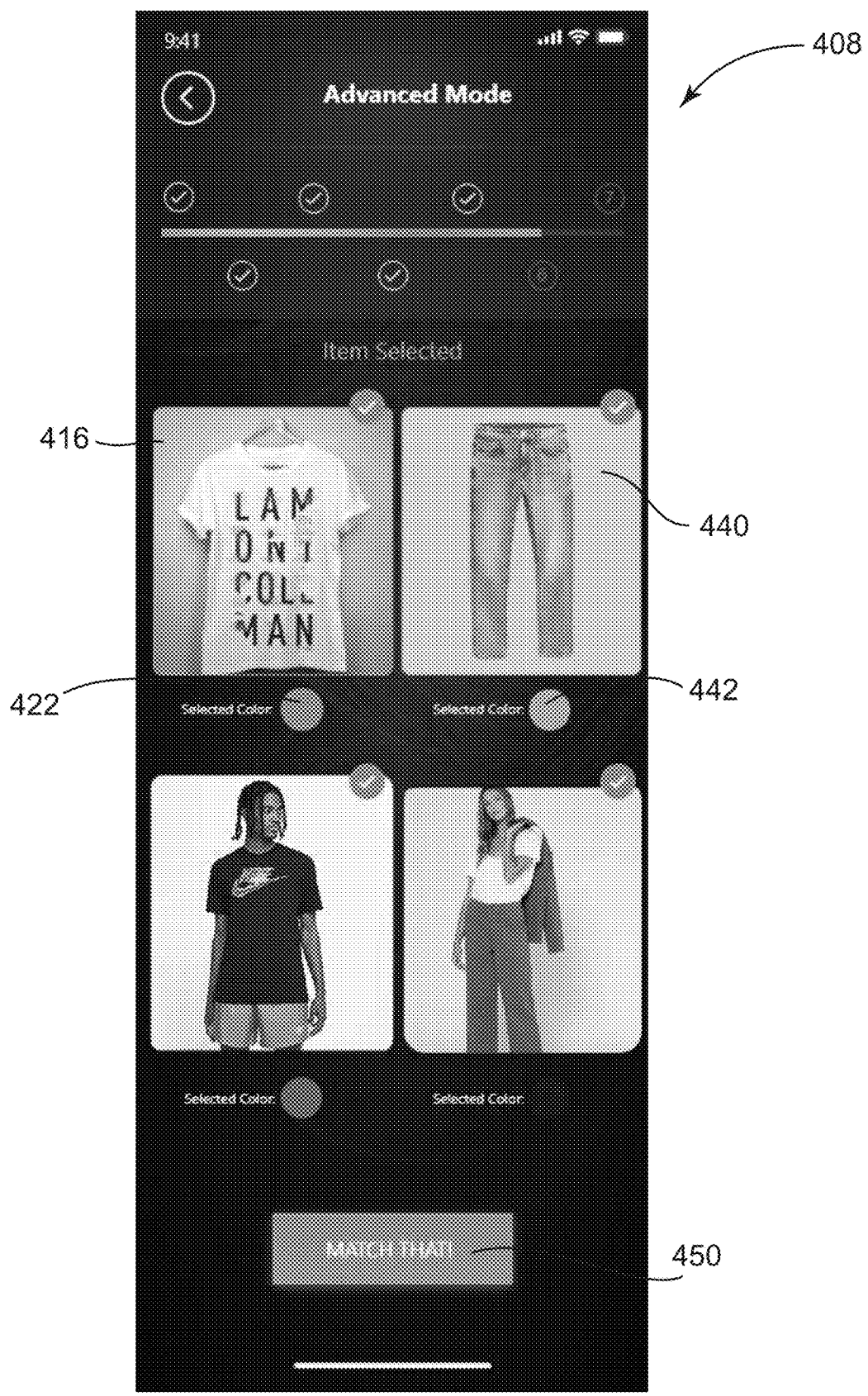
Figure 12I:
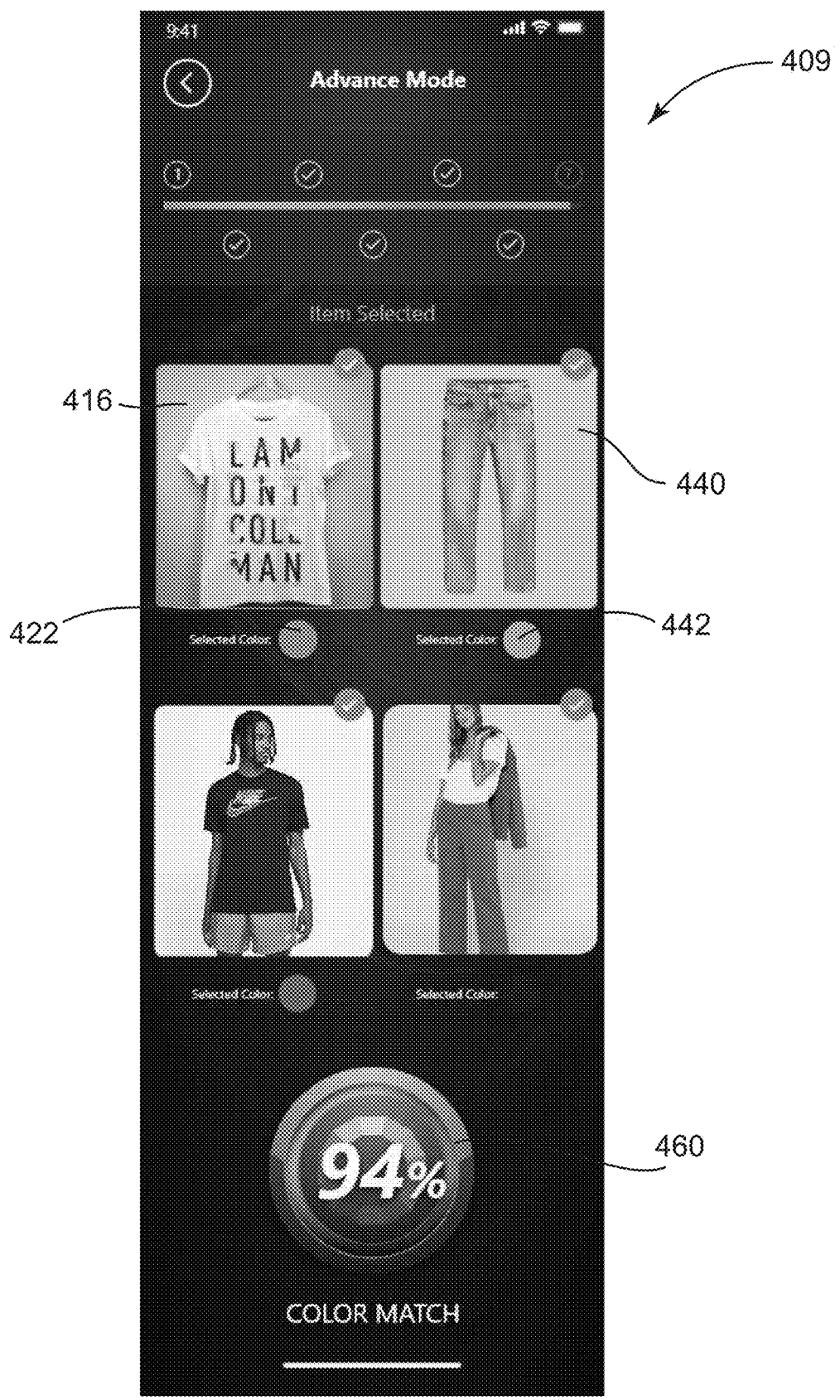

With the input entered with user interface 407, and referring to FIGS. 12H and 12I, the user computing device 12 may be directed to, or have displayed on it, the selected pair user interface 408 that shows the first selected image 416, the first selected color 422, the second selected image 440, and the second selected color 442, as shown in FIG. 12H. The user may then select a match button 450 that then initiates a color match process. The color match process operates to determine the degree of matching between the two selected colors 422 and 442, expressed as a matching percentage 460 from 0% to 100%; and send the matching percentage to the user computing device for display on the user computing device in color match user interface 409, such as the 94% match percentage 460 depicted in FIG. 12I. The user may then have the confidence based on the match percentage 460 to wear the clothes or confidence in the matching of the colors selected for other uses. Additionally, as shown in FIG. 12I, there may be more than two colors utilized in a matching process.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A system for determining a match of colors of different, the system comprising:
 a server comprising a memory for storing user data and digital photographs; and
 a user computing device coupled to the server coupled, wherein the server is programmed to:
  receive a signal that includes first digital photograph data and second digital photograph data, wherein the first digital photograph data includes a first selected digital photograph and a first selected color of the first selected digital photograph, and the second digital photograph data includes a second selected digital photograph and a second selected color of the second photograph;
  automatically store the first and second digital photograph data in a memory of the server;
  process the first and second digital photograph data received to determine the digital codes corresponding to the first and second selected colors, in response to input from the user computing device to determine a match of the first and selected colors;
  perform a comparison analysis to determine the degree of matching between the first and second selected colors, expressed as a matching percentage from 0% to 100%;
  send the matching percentage to the user computing device for display on the user computing device;
  in response to receiving a signal from the user computing device that includes a request for third-party websites connected to the system, send for display on the user computing device at least one third-party website connected to the system and an option to match the first color of the first digital photograph; and
  in response to selection of a third-party website by the user computing device and a request to match to first selected color of the first digital photograph, send the first color of the first digital photograph to the selected third-party website, wherein the user computing device is directed to the selected third-party website and matching products sold on the selected third-party website are displayed on the user computing device that has accessed the selected third-party website.

2. The system of claim 1, wherein the first and second digital photographs are stored on the user computing device and uploaded to the server.

3. The system of claim 1, wherein the first and second digital photographs are taken using a camera of the user computing device and uploaded directly to the server through an application operating on the user computing device.

4. The system of claim 1, wherein the user computing device is configured to send and receive messages, including photos and/or text, audio, and video, to other users of the system and/or other contacts that are not users of the system.

5. A system for determining a match of colors of different, the system comprising:
 a server comprising a memory for storing user data and digital photographs; and
 a user computing device coupled to the server coupled, wherein the server is programmed to:
  receive a signal from the user computing device that the user computing device has accessed the system and send for display on the user computing device an upload picture user interface;
  receive a first selected image uploaded to the server from the user computing device and automatically generate and send for display a pick color user interface displaying the first selected image with a color selection dropper;
  receive a first selected color in response to selection of a color in the first selected image by the dropper and confirmation of the color with the user computing device and store the first selected color in the memory of the server and associate it with the first selected image;

send for display on the user computing device the upload picture user interface after storing the first selected image and the first selected color;

receive a second selected image uploaded to the server from the user computing device and automatically generate and send for display the pick color user interface displaying the second selected image with the color selection dropper;

receive a second selected color in response to selection of a color in the second selected image by the dropper and confirmation of the color with the user computing device and store the second selected color in the memory of the server and associate it with the second selected image;

perform a comparison analysis to determine the degree of matching between the first and second selected colors, expressed as a matching percentage from 0% to 100% in response to a signal received from the user computing device initiating the comparison of the first and second selected colors;

send the matching percentage to the user computing device for display on the user computing device;

in response to receiving a signal from the user computing device that includes a request for third-party websites connected to the system, send for display on the user computing device at least one third-party website connected to the system and an option to match the first color of the first digital photograph; and in response to selection of a third-party website by the user computing device and a request to match to first selected color of the first digital photograph, send the first color of the first digital photograph to the selected third-party website, wherein the user computing device is directed to the selected third-party website and matching products sold on the selected third-party website are displayed on the user computing device that has accessed the selected third-party website.

6. The system of claim 5, wherein the first and second digital photographs are stored on the user computing device and uploaded to the server.

7. The system of claim 5, wherein the first and second digital photographs are taken using a camera of the user computing device and uploaded directly to the server through an application operating on the user computing device.

8. The system of claim 5, wherein the user computing device is configured to send and receive messages, including photos and/or text, audio, and video, to other users of the system and/or other contacts that are not users of the system.

9. A system for determining a match of colors of different, the system comprising:

a server comprising a memory for storing user data and digital photographs; and a user computing device coupled to the server coupled, wherein the server is programmed to:

receive a signal from the user computing device that the user computing device has accessed the system and send for display on the user computing device an upload picture user interface;

receive a first selected image uploaded to the server from the user computing device and automatically generate and send for display a pick color user interface displaying the first selected image with a color selection dropper;

receive a first selected color in response to selection of a color in the first selected image by the dropper and confirmation of the color with the user computing device and store the first selected color in the memory of the server and associate it with the first selected image;

send for display on the user computing device the upload picture user interface after storing the first selected image and the first selected color;

receive a second selected image uploaded to the server from the user computing device and automatically generate and send for display the pick color user interface displaying the second selected image with the color selection dropper;

receive a second selected color in response to selection of a color in the second selected image by the dropper and confirmation of the color with the user computing device and store the second selected color in the memory of the server and associate it with the second selected image;

send for display on the user computing device an item type user interface after storing the first selected image and the first selected color, wherein the item type user interface comprises a plurality of selectable elements comprising at least one of fabrics, items, accessories, make-up, home décor or combinations thereof;

receive at least one selected element from the plurality of selectable elements;

perform a comparison analysis to determine the degree of matching between the first and second selected colors including adjusting the degree of matching by analyzing the at least one selected element, expressed as a matching percentage from 0% to 100% in response to a signal received from the user computing device initiating the comparison of the first and second selected colors;

send the matching percentage to the user computing device for display on the user computing device;

in response to receiving a signal from the user computing device that includes a request for third-party websites connected to the system, send for display on the user computing device at least one third-party website connected to the system and an option to match the first color of the first digital photograph; and in response to selection of a third-party website by the user computing device and a request to match to first selected color of the first digital photograph, send the first color of the first digital photograph to the selected third-party website, wherein the user computing device is directed to the selected third-party website and matching products sold on the selected third-party website are displayed on the user computing device that has accessed the selected third-party website.

10. The system of claim 9, wherein the first and second digital photographs are stored on the user computing device and uploaded to the server.

11. The system of claim 9, wherein the first and second digital photographs are taken using a camera of the user computing device and uploaded directly to the server through an application operating on the user computing device.

12. The system of claim 9, wherein the user computing device is configured to send and receive messages, including photos and/or text, audio, and video, to other users of the system and/or other contacts that are not users of the system.

\* \* \* \* \*